(12) United States Patent
Sawada et al.

(10) Patent No.: US 8,909,398 B2
(45) Date of Patent: Dec. 9, 2014

(54) COOLING SYSTEM OF ELECTRIC VEHICLE

(75) Inventors: Itsuro Sawada, Hitachinaka (JP);
Tadashi Osaka, Kashiwa (JP); Atsushi Yokoyama, Hitachiota (JP); Shingo Nasu, Hitachinaka (JP); Yuto Imanishi, Atsugi (JP); Sachio Sekiya, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 920 days.

(21) Appl. No.: 12/912,986

(22) Filed: Oct. 27, 2010

(65) Prior Publication Data
US 2011/0106358 A1 May 5, 2011

(30) Foreign Application Priority Data

Oct. 29, 2009 (JP) .................. 2009-249165

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)
*B60K 11/02* (2006.01)

(52) U.S. Cl.
CPC ........... *B60K 11/02* (2013.01); *B60L 2240/425* (2013.01); *Y02T 10/642* (2013.01); *Y02T 10/7258* (2013.01); *B60L 2240/525* (2013.01)
USPC ................ 701/22; 165/42; 165/48.1; 165/58; 165/200; 180/65.275

(58) Field of Classification Search
CPC .................... B60K 2001/006; B60K 2025/026; B60K 6/00; B60K 6/12; B60K 15/00; B60K 1/00; B60L 11/14; B60L 3/00; B60L 15/00; B60L 1/00; F28F 27/00; F28F 3/00; F28F 21/00
USPC ........ 701/29, 22, 31.7, 102; 180/65.275, 287, 180/65.31, 65.4, 65.2, 65.1; 165/202, 205, 165/200
See application file for complete search history.

(56) References Cited

U.S. PATENT DOCUMENTS 5,971,290 A * 10/1999 Echigoya et al. ........ 237/12.3 B
6,283,086 B1 * 9/2001 Yamamoto et al. ....... 123/198 D
(Continued)

FOREIGN PATENT DOCUMENTS

JP 11-285106 A 10/1999
JP 2006-321389 A 11/2006
(Continued)

OTHER PUBLICATIONS

European search report dated Feb. 15, 2011.
(Continued)

*Primary Examiner* — Calvin Cheung
*Assistant Examiner* — Luis A Martinez Borrero
(74) *Attorney, Agent, or Firm* — Crowell & Moring LLP

(57) ABSTRACT

A cooling system of an electric vehicle includes a cooling medium circulation path that circulates a cooling medium to an electrically powered drive unit of a vehicle, a heat exchange unit between the cooling medium and external air, a cooling medium circulation unit, a blower unit that blows air against the heat exchange unit, and a control unit that controls the cooling medium circulation unit and the blower unit, thus controlling cooling of the electrically powered drive unit. The control unit controls the cooling medium circulation unit and the blower unit in a first cooling mode, when a drive force for the vehicle is in a first operational region, and controls in a second cooling mode that provides a higher cooling capability than the first cooling mode, when the drive force for the vehicle is in a second operational region that is higher than the first operational region.

9 Claims, 28 Drawing Sheets

(56) References Cited

U.S. PATENT DOCUMENTS

| | | | |
|---|---|---|---|
| 6,448,535 B1* | 9/2002 | Ap | 219/208 |
| 6,616,059 B2* | 9/2003 | Sabhapathy et al. | 237/12.3 B |
| 6,748,757 B2* | 6/2004 | Matsuo et al. | 62/244 |
| 6,860,349 B2* | 3/2005 | Ogawa et al. | 180/65.225 |
| 7,147,071 B2* | 12/2006 | Gering et al. | 237/12.3 B |
| 7,182,129 B2* | 2/2007 | Karl | 165/202 |
| 7,278,475 B2* | 10/2007 | Jones | 165/205 |
| 7,383,903 B2* | 6/2008 | Varenne | 180/65.31 |
| 7,451,808 B2* | 11/2008 | Busse et al. | 165/202 |
| 8,046,126 B2* | 10/2011 | Yanagida et al. | 701/31.7 |
| 8,393,551 B2* | 3/2013 | Nemesh et al. | 237/12.3 B |
| 2004/0093885 A1* | 5/2004 | Ito et al. | 62/244 |
| 2005/0167169 A1* | 8/2005 | Gering et al. | 180/65.2 |
| 2006/0032623 A1* | 2/2006 | Tsubone et al. | 165/202 |
| 2006/0060340 A1* | 3/2006 | Busse et al. | 165/202 |
| 2007/0024244 A1* | 2/2007 | Zhu et al. | 320/150 |
| 2007/0026281 A1* | 2/2007 | Ueda et al. | 429/26 |
| 2007/0181356 A1* | 8/2007 | Ando et al. | 180/65.4 |
| 2007/0209612 A1* | 9/2007 | Kojima | 123/41.49 |
| 2008/0109129 A1* | 5/2008 | Yanagida et al. | 701/29 |
| 2008/0245598 A1* | 10/2008 | Gratz et al. | 180/287 |
| 2009/0015205 A1 | 1/2009 | Katayama | |
| 2009/0139781 A1* | 6/2009 | Straubel | 180/65.1 |
| 2009/0311565 A1* | 12/2009 | Ishikawa | 429/26 |
| 2010/0071637 A1* | 3/2010 | Shintani et al. | 123/41.02 |
| 2010/0076663 A1* | 3/2010 | Jinno et al. | 701/102 |
| 2010/0100266 A1* | 4/2010 | Yoshinori et al. | 701/22 |
| 2010/0295391 A1* | 11/2010 | Perkins | 310/64 |
| 2011/0132291 A1* | 6/2011 | Ulrey et al. | 123/41.1 |

FOREIGN PATENT DOCUMENTS

| | | |
|---|---|---|
| JP | 2007-196876 A | 8/2007 |
| JP | 2008-201165 A | 9/2008 |

OTHER PUBLICATIONS

Japanese Office Action dated Apr. 2, 2013 with English translation (Seven (7) pages).

U.S. Appl. No. 12/858,901, filed Aug. 18, 2010.

* cited by examiner

FIG.5A

|  | FIRST COOLING MODE | SECOND COOLING MODE |
|---|---|---|
| FAN | STEADY OPERATION | OPERATION AT MAXIMUM, OR OPERATION PROPORTIONAL TO MOTOR OUTPUT POWER |
| PUMP | | |

FIG.5B

|  | FIRST COOLING MODE | SECOND COOLING MODE |
|---|---|---|
| FAN | OPERATION PROPORTIONAL TO MOTOR OUTPUT POWER | OPERATION AT MAXIMUM |
| PUMP | | |

FIG.5C

|  | FIRST COOLING MODE | SECOND COOLING MODE |
|---|---|---|
| FAN | STEADY OPERATION | OPERATION AT MAXIMUM, OR OPERATION PROPORTIONAL TO MOTOR OUTPUT POWER |
| PUMP | STEADY OPERATION | |

FIG.5D

|  | FIRST COOLING MODE | SECOND COOLING MODE |
|---|---|---|
| FAN | STEADY OPERATION | |
| PUMP | STEADY OPERATION | OPERATION AT MAXIMUM, OR OPERATION PROPORTIONAL TO MOTOR OUTPUT POWER |

COOLING SYSTEM OF ELECTRIC VEHICLE

INCORPORATION BY REFERENCE

The disclosure of the following priority application is herein incorporated by reference: Japanese Patent Application No. 2009-249165, filed Oct. 29, 2009.

BACKGROUND OF THE INVENTION

1. Field of the Invention

The present invention relates to an improved cooling system of an electric vehicle.

2. Description of Related Art

A cooling system of an electric vehicle that cools an electric motor for driving a hybrid vehicle and that also cools its inverter power supply is per se known (for example, refer to Japanese Laid-Open Patent Publication H11-285106).

SUMMARY OF THE INVENTION

Now, the physical structure (the size and the dimensions) of an electric motor for driving a vehicle and of an inverter power supply for that motor are designed on the basis of the maximum torque and the maximum output power required when starting off from rest, during acceleration, while ascending a slope, and so on. However, actually the values of torque and output power that are used on a routine basis by the vehicle are substantially smaller than the maximum possible torque and the highest possible output power, and during normal traveling the maximum torque or the maximum output power is not required very often; and, even when the maximum torque or the maximum output power is required, the period over which this maximum is required is generally quite short. In other words, for an electric vehicle, the maximum torque and the maximum output power that can conceivably be employed even very occasionally and even over a very short time period are taken as a design reference, and accordingly a motor and an inverter power supply having large physical structure are used, irrespective of whether or not during steady operation the torque and/or the output power are actually much lower.

According to the 1st aspect of the present invention, a cooling system of an electric vehicle comprises: a cooling medium circulation path in which a cooling medium is circulated to an electrically powered drive unit that drives a vehicle by electrical power; a heat exchange unit that performs exchange of heat between the cooling medium and external air; a cooling medium circulation unit that circulates the cooling medium along the cooling medium circulation path between the heat exchange unit and the electrically powered drive unit; a blower unit that blows air against the heat exchange unit; and a control unit that controls the cooling medium circulation unit and the blower unit, thus controlling cooling of the electrically powered drive unit; and wherein the control unit: when a drive force for the vehicle provided by the electrically powered drive unit is in a first operational region, controls the cooling medium circulation unit and the blower unit in a first cooling mode; and, when the drive force for the vehicle provided by the electrically powered drive unit is in a second operational region that is higher than the first operational region, controls the cooling medium circulation unit and the blower unit in a second cooling mode that provides a higher cooling capability than that provided in the first cooling mode.

According to the 2nd aspect of the present invention, in a cooling system of an electric vehicle according to the 1st aspect, it is preferred that, when the drive force for the vehicle is generated continuously in the first operational region by the electrically powered drive unit, a cooling capability in the first cooling mode is a cooling capability that maintains a temperature of the electrically powered drive unit less than or equal to an upper limit temperature; and, when drive force for the vehicle is generated for a short time period in the second operational region by the electrically powered drive unit, a cooling capability in the second cooling mode is a cooling capability that maintains a temperature of the electrically powered drive unit less than or equal to the upper limit temperature.

According to the 3rd aspect of the present invention, a cooling system of an electric vehicle according to the 1st aspect further comprises: a vehicle speed detection unit that detects the speed of the vehicle; and an accelerator pedal depression amount detection unit that detects an accelerator pedal depression amount; and wherein the control unit obtains the drive force for the vehicle based on a speed detected by the vehicle speed detection unit and on the accelerator pedal depression amount detected by the accelerator pedal depression unit, and selects the first cooling mode or the second cooling mode according to whether an operating point of torque and rotational speed of the electrically powered drive unit corresponding to the drive force for the vehicle lies in the first operational region or the second operational region.

According to the 4th aspect of the present invention, a cooling system of an electric vehicle according to the 3rd aspect further comprises: a path search unit that searches for a path to a destination; a current position detection unit that detects a current position of the vehicle; an acquisition unit that acquires a road information; and a forecasting unit that forecasts operating point of the electrically powered drive unit upon a road of the path based on the road information for the path; and wherein the control unit changes over from the first cooling mode to the second cooling mode even if the operating point of the electrically powered drive unit at the current position is in the first operational region if, based on results of forecasting by the forecasting unit, there is a road within a predetermined distance forward of the current position for which the second operational region will be applied.

According to the 5th aspect of the present invention, a cooling system of an electric vehicle according to the 3rd aspect further comprises a changeover control member for a human being manually to change over between the first cooling mode and the second cooling mode; and wherein the control unit changes over from the first cooling mode to the second cooling mode even if the operating point of the electrically powered drive unit is in the first operational region if the second cooling mode has been selected by the changeover control member.

According to the 6th aspect of the present invention, a cooling system of an electric vehicle according to the 1st aspect further comprises a temperature detection unit that detects an external air temperature; and wherein the control unit makes the first operational region narrower and makes the second operational region wider, the higher is the external air temperature detected by the temperature detection unit.

According to the 7th aspect of the present invention, in a cooling system of an electric vehicle according to the 1st aspect, it is preferred that the control unit obtains a target temperature for the electrically powered drive unit at which a sum of loss generated by the electrically powered drive unit for obtaining drive force for the vehicle, and electrical power consumed by the cooling medium circulation unit and the blower unit for cooling generated heat accompanying the loss, becomes a minimum, and controls the cooling medium circulation unit and the blower unit so that a temperature of the electrically powered drive unit attains the target temperature.

According to the 8th aspect of the present invention, a cooling system of an electric vehicle according to the 1st aspect further comprises: an identification unit that identifies a driver of the vehicle; and a storage unit that stores driving history for each driver; and wherein the control unit determines a driving tendency of the driver by reading out the driving history of the driver from the storage unit, and changes boundary between the first operational region and the second operational region according to the driving tendency of this determination results.

According to the 9th aspect of the present invention, in a cooling system of an electric vehicle according to the 1st aspect, it is preferred that the heat exchange unit includes another cooling medium circulation path different from the cooling medium circulation path, and comprises, in this another cooling medium circulation path: a compressor that compresses another cooling medium; a condenser that condenses the another cooling medium after compression with dissipating heat therefrom to external air; an expansion valve that lowers a pressure of the another cooling medium after condensation; and an evaporator that vaporizes the another cooling medium and absorbs heat from the cooling medium upon the cooling medium circulation path.

According to the 10th aspect of the present invention, in a cooling system of an electric vehicle according to the 1st aspect, it is preferred that the electrically powered drive unit comprises an electric motor that drives the vehicle to travel and an electrical power converter that drives the electric motor, and the electrical power converter is provided on an upstream side of the cooling medium circulation path while the electric motor is provided on a downstream side thereof.

According to the 11th aspect of the present invention, an electric vehicle comprises a cooling system of an electric vehicle according to claim 1 that cools the electrically powered drive unit.

According to the present invention, it is possible to reduce the physical structure (the size and the dimensions) of the electric motor and the inverter power supply, while still obtaining torque and output power equivalent to those in the prior art. Moreover, it is possible to reduce the consumption of electrical power by a pump and a fan, and thereby it is possible to enhance the operating efficiency of the electric vehicle as a whole.

BRIEF DESCRIPTION OF THE DRAWINGS

FIG. 5A through 5D are tables showing the respective operating methods A through D for a fan and a pump, in a first cooling mode in a first operational region and in a second cooling mode in a second operational region;

DESCRIPTION OF THE PREFERRED EMBODIMENTS

Embodiments in which the cooling system of an electric vehicle according to the present invention is applied to an electric automobile will now be explained. It should be understood that the application of the present invention is not limited to an electric automobile; it can also be applied to a hybrid automobile or to an electric locomotive or an electric construction vehicle or the like. Moreover while by way of example, in the description of these embodiments, the present invention has been explained in terms of an AC electric motor that is driven by an inverter power supply, the field of application of the present invention is not limited to AC electric motors. For example, the present invention could also be applied to a rotating electrical machine (i.e. a motor-generator) of any of various types, such as a DC electric motor that is driven by a converter power supply such as a thyristor Leonardo device or the like, or to a pulse type electric motor that is driven by a chopper power supply, or the like.

Embodiment 1

Figure 1:
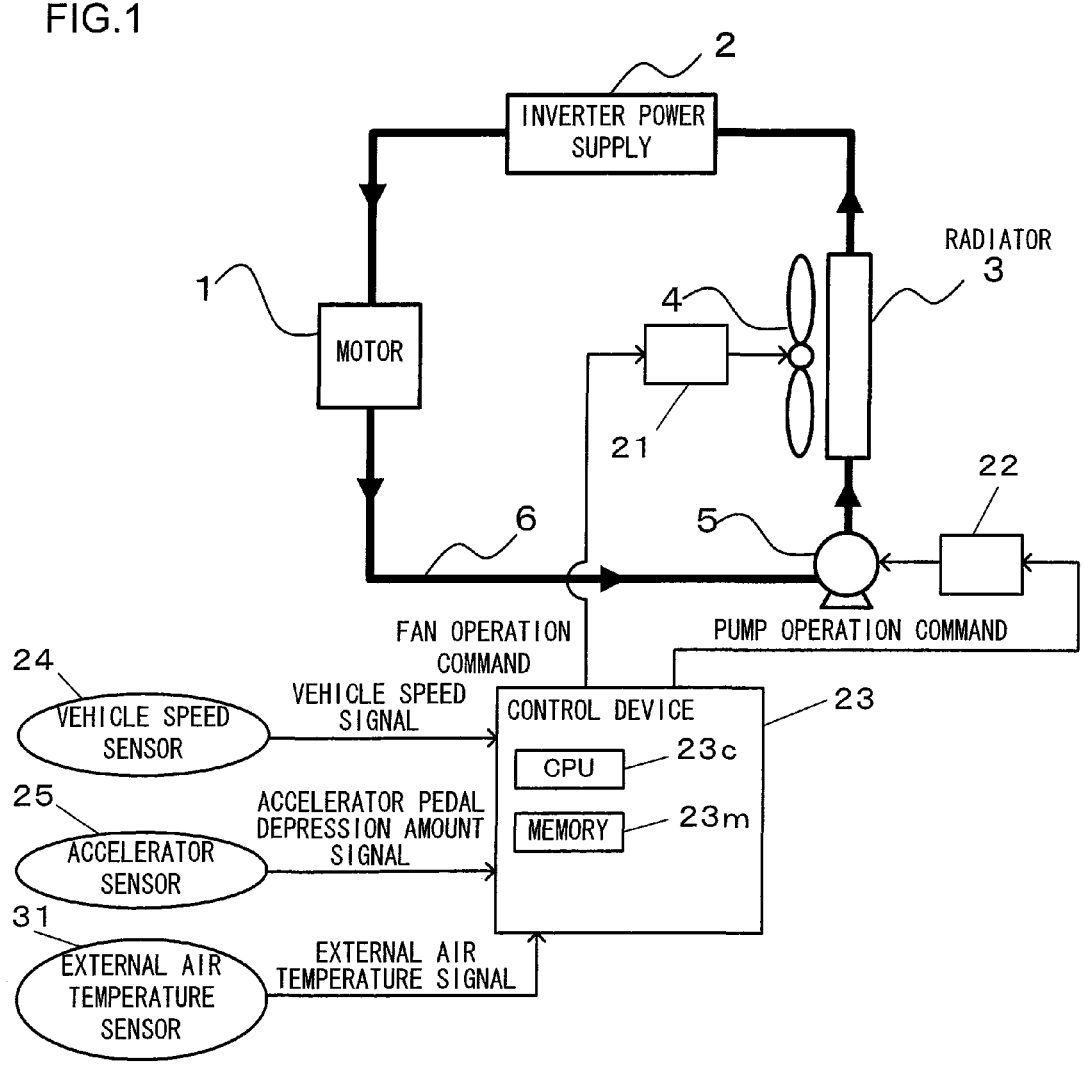
FIG. 1 is a figure showing the structure of a cooling system for an electric vehicle according to a first embodiment.

FIG. 1 is a figure showing the structure of a cooling system for an electric vehicle according to a first embodiment of the present invention. This cooling system for an electric vehicle includes a radiator 3 for cooling an electric motor 1 for driving the vehicle and an inverter power supply 2 that drives this motor 1, a fan 4, a pump 5, a cooling medium circulation path 6, a fan drive device 21, a pump drive device 22, and a control device 23. The cooling medium circulation path 6 circulates a cooling medium around the path pump 5→radiator 3→inverter power supply 2→motor 1→pump 5. The cooling medium expelled from the pump 5 is cooled by the radiator 3 due to air being blown therethrough by the fan 4, cools the inverter power supply 2 and the motor 1, and then returns to the pump 5.

In this embodiment, the cooling medium that has been cooled due to heat dissipation by the radiator 3 is first sent to the inverter power supply 2, and, after having cooled the inverter power supply 2, is sent to the motor 1 and cools the motor 1. Generally, it is desirable for the layout of the cooling medium flow path 6 to be arranged so that the cooling medium is first circulated to the inverter power supply 2 to cool it first and then subsequently is circulated to the motor 1 to cool it second, because a semiconductor electrical power conversion device such as the inverter power supply 2 or the like has a heat capacity smaller than that of the motor 1 so that its temperature rise is more abrupt; however, it would also be acceptable to provide a flow path in which the cooling medium is first circulated to the motor 1 to cool it first and then subsequently is circulated to the inverter power supply 2 to cool it second.

Figure 2:
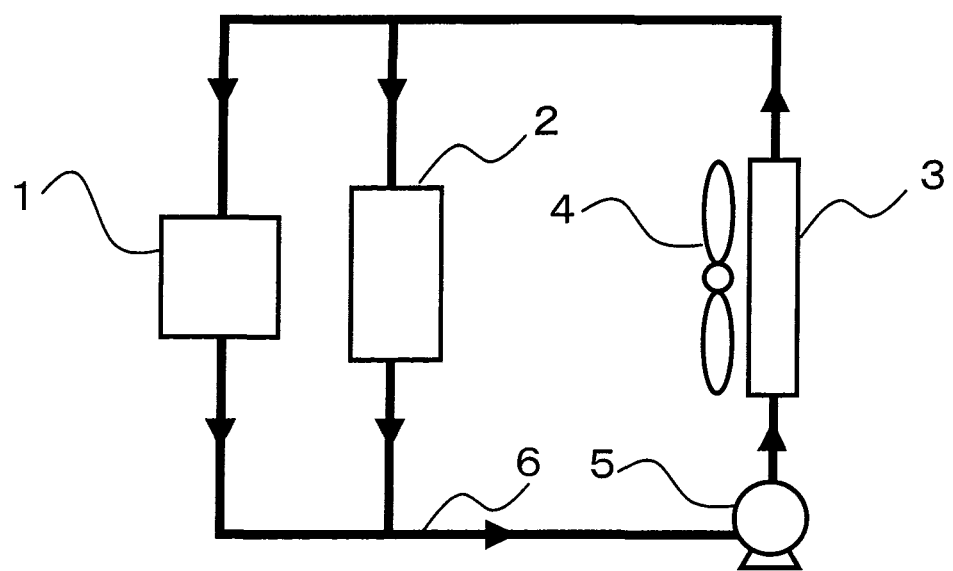
FIG. 2 is a figure showing a variant embodiment of this cooling system for an electric vehicle.
Figure 3A:
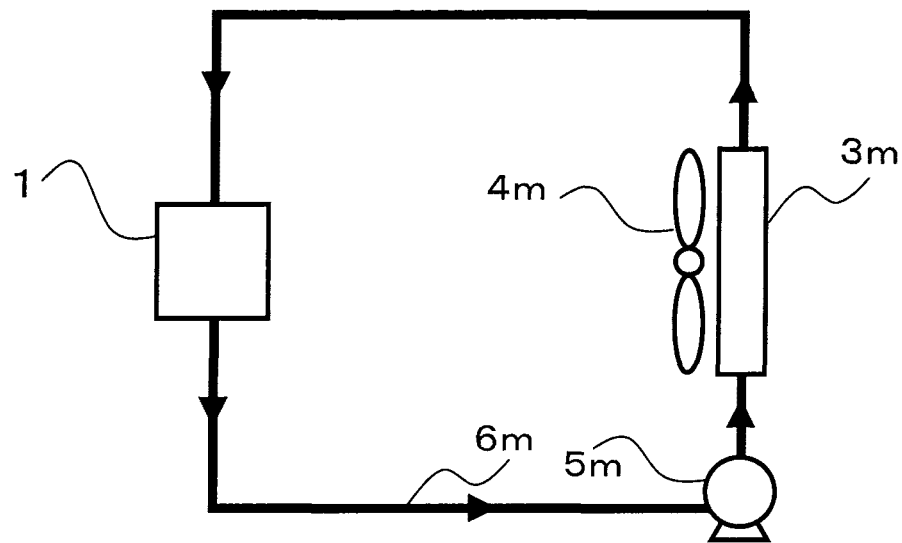
FIG. 3A and FIG. 3B are figures showing another variant embodiment of this cooling system for an electric vehicle.
Figure 3B:
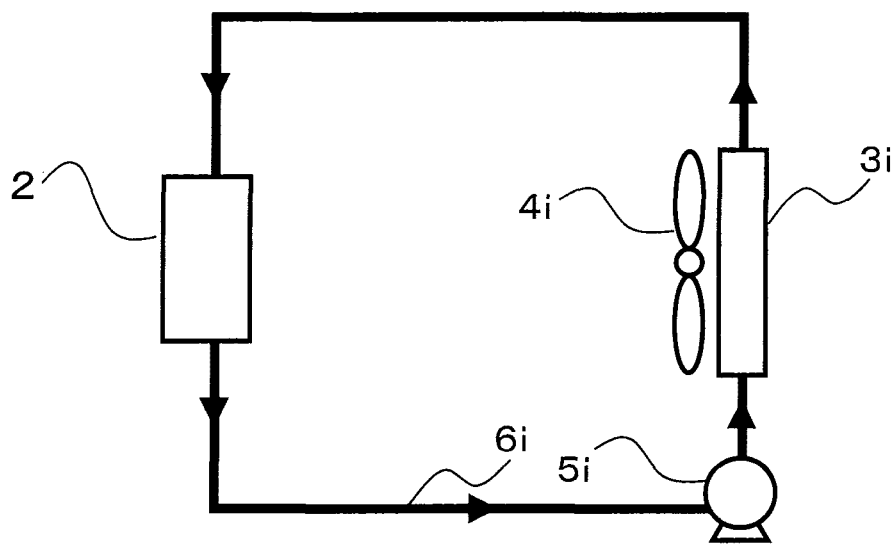

Moreover, as shown in FIG. 2, it would also be acceptable to connect the motor 1 and the inverter power supply 2 in parallel in the cooling medium circulation path 6, so that the cooling medium that is ejected from the pump 5 is supplied via the radiator 3 to the motor 1 and the inverter power supply 2 in parallel and is circulated therethrough in parallel. Furthermore, it would also be acceptable to provide separate cooling medium circulation paths 6m and 6i for the motor 1 and for the inverter power supply 2 respectively, with the circulation path 6m including its own pump 6m and radiator 5m as shown in FIG. 3A, and with the circulation path 6i including its own pump 6i and radiator 5i as shown in FIG. 3B. In FIG. 3A, the cooling medium that has been expelled from the pump 5m is passed through the radiator 3m and is cooled therein by air blown therethrough by the fan 4m, and then is conducted to the motor 1 to cool it, then being returned to the pump 5m. And, in FIG. 3B, the cooling medium that has been expelled from the pump 5i is passed through the radiator 3i and is cooled therein by air blown therethrough by the fan 4i, and then is conducted to the inverter power supply 2 to cool it, then being returned to the pump 5i.

While in this embodiment, by way of example, the subject for cooling by this cooling system for an electric vehicle is shown as being both of the motor 1 and the inverter power supply 2, it would also be acceptable to arrange for this subject for cooling to be only either the motor 1 or the inverter power supply 2. Furthermore, apart from the motor 1 and the inverter power supply 2, as an additional subject for cooling, it would also be acceptable to add an electricity storage device (described hereinafter) that performs transfer of DC electrical power between the motor 1 and the inverter power supply 2.

In FIG. 1, a control device 23 includes a CPU 23c, a memory 23m, and so on, and executes a cooling control program that will be described hereinafter so as to control a fan drive device 21 and a pump drive device 22, thus controlling the cooling of the motor 1 and the inverter power supply 2. A vehicle speed sensor 24 that detects the speed of this automobile and an accelerator pedal sensor 25 that detects the amount of depression of the accelerator pedal of the automobile, are connected to this control device 23.

Next, a method of designing the physical size (i.e. body size, dimensions) of the motor 1 and the inverter power supply 2 for driving the electric automobile in an embodiment will be explained. With an motor or an inverter power supply, generally there is a relationship of mutual correlation between physical size, maximum torque and maximum output power, and cooling capability. For example, if the physical size and the cooling capability of the motor are determined, then the amount of heat to be generated by the motor itself in order for the motor to be kept at or below an upper limit temperature is determined, and accordingly the maximum torque and the maximum output power for the motor at which this amount of heat is generated are also determined. Furthermore, if the physical size and the maximum torque and the maximum output power of the motor are determined, then the cooling capability in order for the motor to be kept at or below the upper limit temperature is determined. On the other hand, the physical size of the motor or the inverter power supply is proportioned to the maximum torque and the maximum output power, and the larger is the physical size, the greater the maximum torque and the maximum output power become.

As described above, in the prior art, the physical size of an motor or an inverter power supply is designed on the basis of the maximum torque or the maximum output power required when starting off from rest, during acceleration, while ascending a slope, or the like. However, actually the values of torque and output power that are used on a routine basis by the vehicle are substantially smaller than the maximum possible torque and the highest possible output power, and during normal traveling the maximum torque and/or the maximum output power is not required very often; and, even when the maximum torque or the maximum output power is required, the period over which this maximum is required is generally quite short. Irrespective of whether or not the torque or the output power during steady operation is small, the prior art has employed an motor and an inverter power supply having large physical sizes that have been designed by taking as reference the maximum torque and the maximum output power that may be used even very occasionally and even only for short time periods. In this embodiment, the physical sizes of the motor and the inverter power supply are made more compact while still obtaining the maximum necessary torque and the maximum necessary output power, by performing appropriate cooling of the motor and the inverter power supply.

Figure 4A:
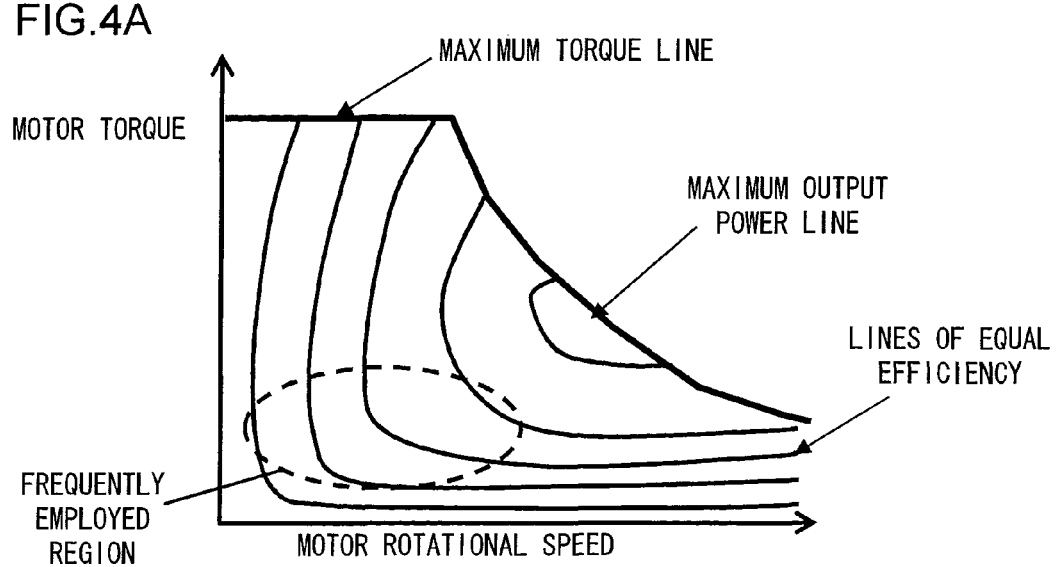
FIG. 4A is a figure showing the characteristic of torque with respect to rotational speed of a prior art electric motor.
Figure 4B:
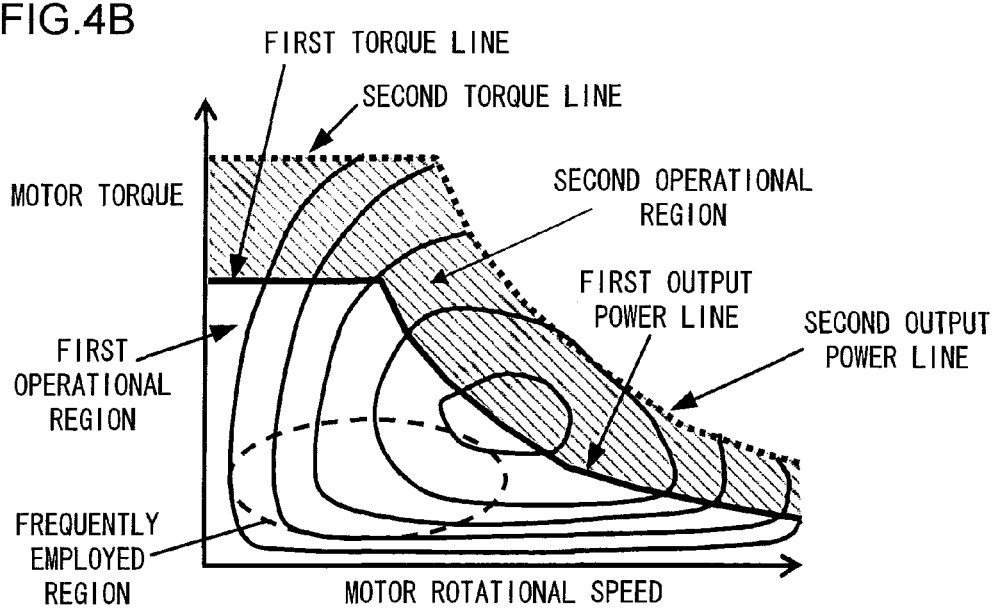
FIG. 4B is a figure showing the characteristic of torque with respect to rotational speed of an electric motor of an embodiment of the present invention.

FIG. 4A shows the characteristic of torque with respect to rotational speed of a prior art motor, while FIG. 4B is a figure showing the characteristic of torque with respect to rotational speed of the motor 1 of an embodiment of the present invention. In the low rotational speed region, all motors use torque at a constant torque level limited to less than or equal to a maximum torque, while in the high rotational speed region they use output power at a constant output power limited to less than or equal to a maximum output power (to put it in another manner, the torque is reduced according to increase of the rotational speed). In FIG. 4A, the physical size of a prior art motor and inverter power supply have been determined on the basis of the maximum torque and the maximum output power that are required when starting off from rest, during acceleration, while ascending a slope, or the like.

By contrast, with the motor 1 and the inverter power supply 2 of this invention, as shown in FIG. 4B, the operational region determined by the rotational speed and the torque of the motor 1 is subdivided into a first operational region and a second operational region, and the first operational region is considered as being an operational region for torque and output power at lower load than heavy, as required during steady operation when traveling at almost constant speed upon a horizontal road surface or the like, excluding the heavy load such as starting off from rest, acceleration, ascending a slope and so on; while the second operational region is considered as being an operational region for torque and output power at heavy load when greater torque and output power are required than during such steady operation, such as when starting off from rest, during acceleration, while ascending a slope and so on.

The torque upon the second torque line and the output power along the second output power line that are shown by broken lines in the second operational region in FIG. 4B are respectively equivalent to or greater than the maximum torque upon the maximum torque line and the maximum output power upon the maximum output power line of a prior art motor as shown in FIG. 4A. Moreover, the boundary line shown by the solid line between the first operational region and the second operational region gives a first torque line upon which the torque is lower than the torque upon the second torque line of the second operational region, and a first output power line upon which the output power is lower than the output power upon the second output power line of the second operational region.

Furthermore, in this embodiment, it is arranged for the cooling capability of the cooling system for the motor 1 and the inverter power supply 2 to be different in the first operational region and the second operational region described above, and for the cooling capability in the second operational region in which the torque and the output power are larger to be greater than the cooling capability in the first operational region. In the first operational region, the fan 4 and the pump 5 are operated and controlled so as to provide a cooling capability with which the respective upper limit temperatures of the motor 1 and the inverter power supply 2 are not exceeded, while torque and output power in the region surrounded by the first torque line and the first output power line shown by the solid line in FIG. 4B are continuously generated by the motor 1 and the inverter power supply 2. In this specification, the cooling mode for the motor 1 and the inverter power supply 2 in the first operational region will be termed the "first cooling mode".

On the other hand, in the second operational region, the fan 4 and the pump 5 are operated and controlled so as to provide a cooling capability with which the respective upper limit temperatures of the motor 1 and the inverter power supply 2 are not exceeded, while torque and output power in the hatched region surrounded by the second torque line and the second output power line shown by the broken line in FIG. 4B are generated for a short time period by the motor 1 and the inverter power supply 2. In this specification, the cooling mode for the motor 1 and the inverter power supply 2 in the second operational region will be termed the "second cooling mode".

The torque and the output power in the first operational region surrounded by the first torque line and the first output power line are not large torque and output power required by the electric vehicle during heavy load conditions, as when starting off from rest, during acceleration, while ascending a slope, and so on, but rather are smaller torque and output power required during conditions of other than heavy load, i.e. during steady operation such as when traveling at almost constant speed upon a horizontal road surface or the like, and are representative torque and output power that can be generated continuously. In other words, the torque upon the first torque line is the rated continuous torque, and the output power upon the first output power line is the rated continuous output power.

By contrast, the torque and the output power in the second operational region surrounded by the second torque line and the second output power line are large torque and output power required by the electric vehicle during heavy load conditions in which the load is greater than the load during steady operation, as when starting off from rest, during acceleration, while ascending a slope, and so on, and are torque and output power that can be generated over a relatively short time period. In other words, the torque upon the second torque line is the short-time rated torque, and the output power upon the second output power line is the short-time rated output power.

Here, by a short time period is meant a representative time period over which it is required to generate higher torque and output power than during steady operation of the electric vehicle, as when starting off from rest, during acceleration, while ascending a slope, and so on. Moreover, the upper limit temperature for the motor 1 is determined on the basis of the maximum permitted temperature for the insulating material of the motor 1 and so on, while the upper limit temperature for the inverter power supply 2 is determined on the basis of the maximum permitted temperature for its switching elements for electrical power conversion and so on.

FIG. 5 is a set of tables showing operating methods A through D for the fan 4 and the pump 5, for the first cooling mode in the first operational region and for the second cooling mode in the second operational region. With each of these operating methods A through D, the fan 4 and/or the pump 5 are operated so that the cooling capability for the second cooling mode becomes higher than the cooling capability for the first cooling mode, and: in the first cooling mode, the fan 4 and the pump 5 are operated and controlled so as to keep the temperatures of the motor 1 and the inverter power supply 2 less than or equal to their respective upper limit temperatures, while continuously generating relatively low torque and output power during the steady operation described above; while on the other hand, in the second cooling mode, the fan 4 and the pump 5 are operated and controlled so as to keep the temperatures of the motor 1 and the inverter power supply 2 less than or equal to their respective upper limit temperatures while generating, for a short time period, the torque and output power that are required during heavy load conditions, as when starting off from rest, during acceleration, while ascending a slope, or the like.

With the operating method A shown in FIG. 5 for the fan 4 and the pump 5, in the first cooling mode both the fan 4 and the pump 5 are operated steadily at predetermined speed, while in the second cooling mode either the fan 4 and the pump 5 are operated at their respective highest speeds, or they are operated so that they provide a cooling capability that is proportioned to the torque or to the output power generated by the motor 1. And, in the operating method B, in the first cooling mode both the fan 4 and the pump 5 are operated so that they provide a cooling capability that is proportioned to the torque or to the output power generated by the motor 1, while in the second cooling mode the fan 4 and the pump 5 are each operated at their full capacity and at maximum speed.

Furthermore, in the operating method C, the operating methods for the fan 4 and for the pump 5 are arranged to be different. In the first cooling mode, the fan 4 is operated steadily at a predetermined speed, while in the second cooling mode it is either operated at its maximum highest speed, or it is operated so that it provides a cooling capability that is proportioned to the torque or to the output power generated by the motor 1. By contrast, the pump 5 is operated steadily at a predetermined speed in both the first cooling mode and the second cooling mode. In a similar manner, in the operating method D, the operating methods for the fan 4 and for the pump 5 are arranged to be different. The fan 4 is operated steadily at a predetermined speed in both the first cooling mode and the second cooling mode. By contrast, in the first cooling mode, the pump 5 is operated steadily at a predetermined speed, while in the second cooling mode it is either operated at its maximum highest speed, or it is operated so that it provides a cooling capability that is proportioned to the torque or to the output power generated by the motor 1.

The methods of operation of the fan 4 and the pump 5 in the first cooling mode and the second cooling mode are not to be considered as being limited to the operating methods A through D shown in FIG. 5 and described above; any appropriate combination of operating methods may be adopted, provided that the cooling capability in the second cooling mode is higher than the cooling capability in the first cooling mode. It should be understood that, among such operating methods, those in which the fan 4 and/or the pump 5 is operated so as to provide a cooling capability that suitably proportioned to the torque or to the output power generated by the motor 1 make it possible to operate the fan 4 and the pump 5 with better efficiency, as compared to those in which the fan 4 and the pump 5 are operated steadily.

Figure 6:
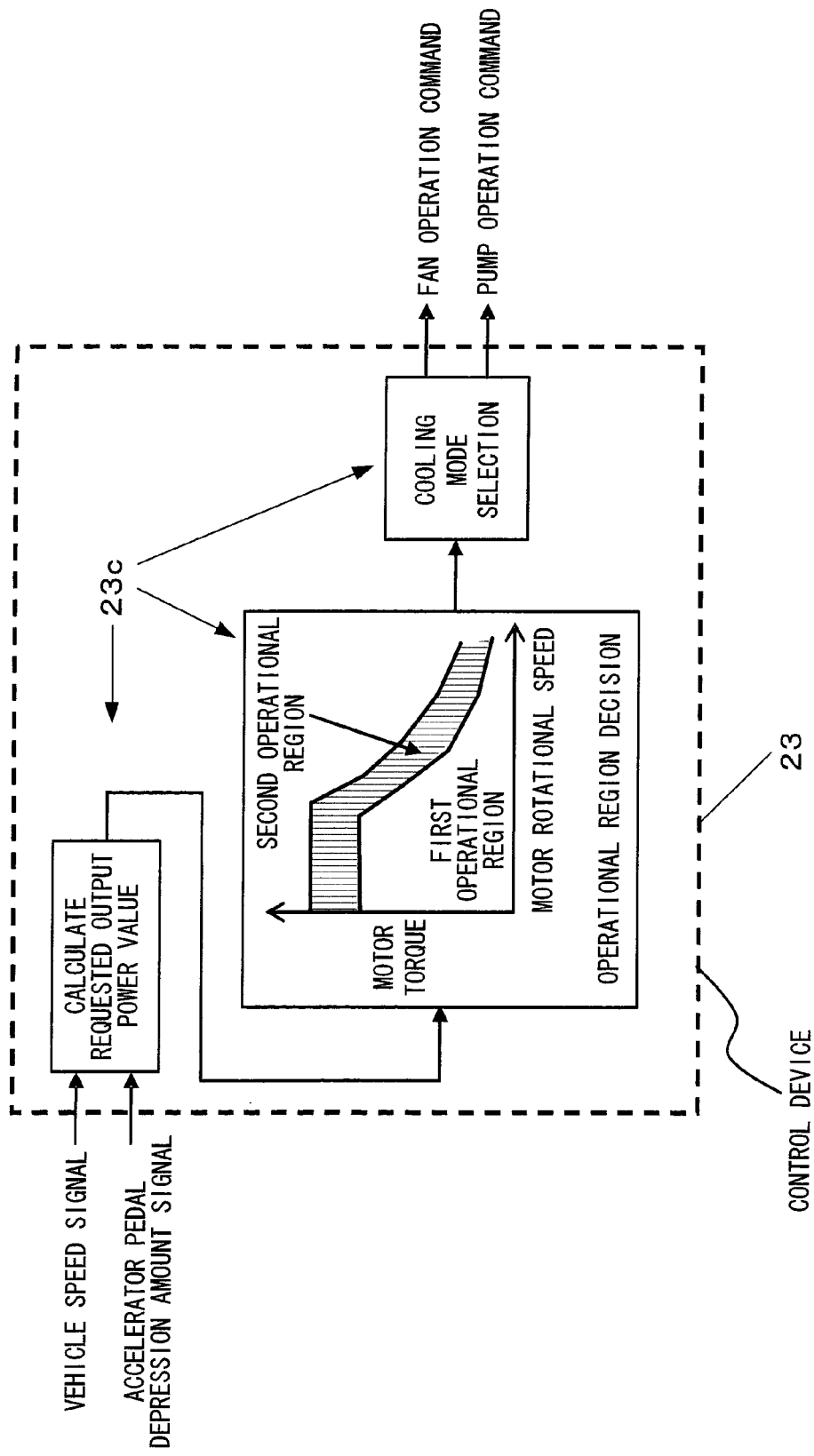
FIG. 6 is a block diagram showing cooling mode selection control in this first embodiment.
Figure 7:
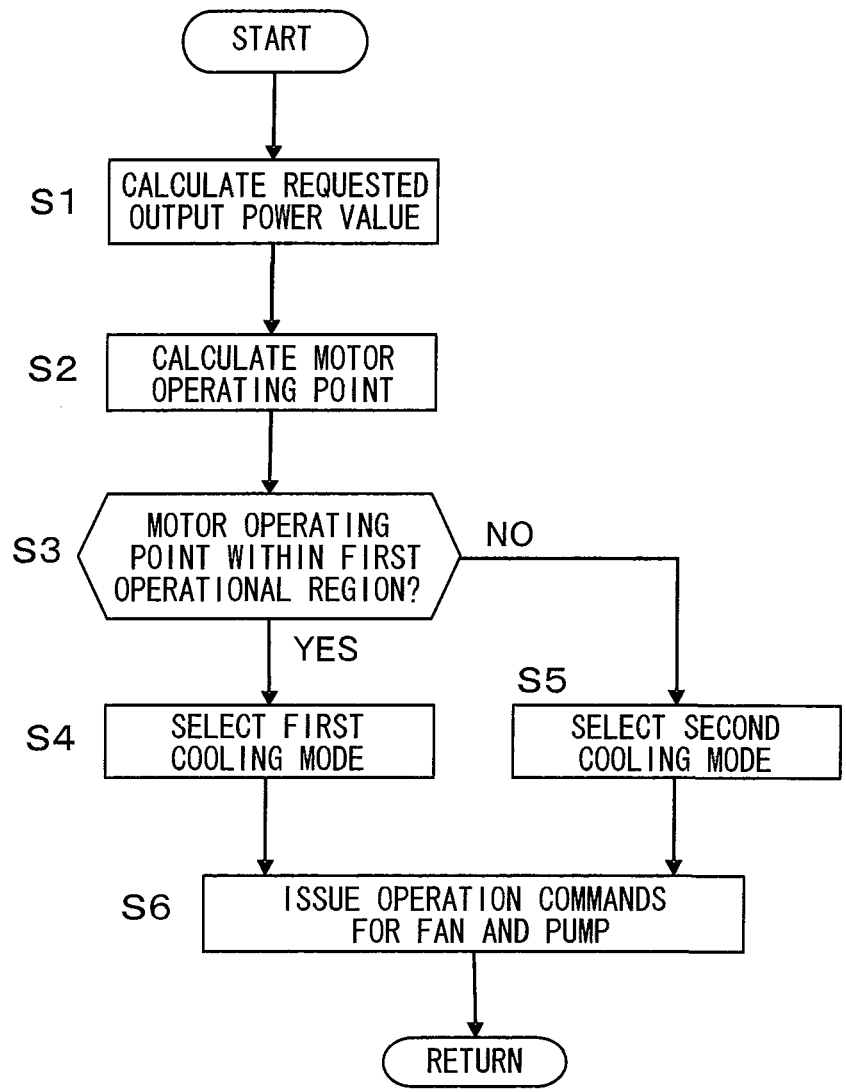
FIG. 7 is a flow chart showing a cooling mode selection control program of this first embodiment.

FIG. 6 is a block diagram showing cooling mode selection control in this first embodiment, and FIG. 7 is a flow chart showing a cooling mode selection control program of this first embodiment. The operation for selection of cooling mode in this first embodiment will now be explained using these figures. The CPU 23c of the control device 23 constitutes a cooling mode selection control block which is realized with software installed on the microcomputer as shown in FIG. 6, and while an ignition key switch (not shown in the figures) is ON it repeatedly executes the cooling mode selection control program shown in FIG. 7.

In a first step S1, the vehicle speed signal is inputted from the vehicle speed sensor 10 and the accelerator pedal depression amount signal is inputted from the accelerator sensor 11, and from these the value of the output power that is being requested from the motor 1 is calculated. Since the amount of depression of the accelerator pedal is proportional to the requested torque value from the electric vehicle, accordingly the value of the drive force that is being requested from the electric vehicle, in other words the output power value that is being requested from the motor 1, is calculated by converting this accelerator pedal depression amount into a requested torque value and multiplying it by the vehicle speed.

In the next step S2, in order to judge if the operating point determined by the torque of motor 1 according to a requested torque and a vehicle speed and by a rotational speed falls within the above mentioned first operational region or second operational region, at first, the operating point of the electric vehicle is determined according to the torque and the rotational speed of the motor 1, by converting the requested torque value into the torque of the motor 1 according to the speed change ratio of a speed change mechanism (not shown in the figures) and by converting the vehicle speed into the rotational speed of the motor 1 according to the speed change ratio of the speed change mechanism. Next in a step S3, a judgment is done as to whether or not this operating point falls within the first operational region or the second operational region as described above, and a cooling mode is selected according to the operational region that is the result of this decision.

If the operating point of the motor 1 is within the first operational region, then the flow of control proceeds to a step S4 in which the first cooling mode is selected; while, if the operating point of the motor 1 is within the second operational region, then the flow of control proceeds to a step S5 in which the second cooling mode is selected. In either case the flow of control then proceeds to a step S6 in which, according to the result of cooling mode selection, an operation command is sent to the fan drive device 21 for operation of the fan 4 in either the first cooling mode or the second cooling mode, and also an operation command is sent to the pump drive device 22 for operation of the pump 5 in either the first cooling mode or the second cooling mode.

With an electric motor and an inverter power supply for an electric vehicle according to the prior art, cooling is performed so as to provide a high and uniform cooling capability in the relatively broad operational region that is surrounded by the maximum torque line and the maximum output power line shown in FIG. 4A, and, since the physical sizes of the electric motor and of the inverter power supply are determined on the basis of the maximum torque upon the maximum torque line and the maximum output power upon the maximum output power line, accordingly these physical sizes become larger than those that are required to correspond to the relatively small torque and output power during the above described steady operation. By contrast, in this embodiment, by dividing the operational region of the motor 1 into the above described first operational region in which comparatively low torque and comparatively low output power are generated during the above described steady operation, and the above described second operational region in which comparatively high torque and comparatively high output power are generated as, for example, when starting off from rest, during acceleration, while ascending a slope and so on, and by performing cooling in the second operational region so as to provide a higher cooling capability than the cooling capability provided in the first operational region, accordingly the physical sizes of the motor 1 and the inverter power supply 2 are not determined upon the basis of the second torque line and the second output power line of the second operational region (refer to FIG. 4B) that correspond to the maximum torque line and the maximum output power line in the prior art (refer to FIG. 4A), but rather, the physical sizes of the motor 1 and the inverter power supply 2 are determined on the basis of the first torque line and the first output power line of the first operational region that are lower than those second lines; and therefore it is possible to reduce the physical sizes of the motor 1 and the inverter power supply 2, so that they become smaller than in the prior art.

Furthermore, with this cooling system for an electric vehicle according to the first embodiment of the present invention, it is possible to operate the motor 1 in an operational region in which the efficiency is high. In the characteristic figures shown in FIG. 4 for torque of the motor with respect to rotational speed, lines of equal efficiency are drawn that show the operating efficiency of the motor. Since in the prior art the physical size of the motor is determined on the basis of the maximum torque line and the maximum output power line, accordingly, as shown in FIG. 4A, operating points in the operational region that is most usually employed during normal traveling (shown by the broken line in FIG. 4A), in other words operating points during steady operation when the torque and the output power are relatively small, lie in a region in which the efficiency is low. By contrast, in this first embodiment of the present invention, since the physical size of the motor 1 is determined on the basis of the first torque line and the first output power line during steady operation, accordingly, as shown in FIG. 4B, operating points in the operational region that is most usually employed during normal traveling (shown by the broken line in FIG. 4B), in other words operating points during steady operation when the torque and the output power are relatively small, lie in a region in which the efficiency is substantially higher than in the prior art. In other words, according to this first embodiment, it is possible to operate the motor 1 with higher efficiency than in the prior art, and therefore it is possible to reduce the consumption of electrical power.

Yet further, according to this first embodiment, since the cooling capabilities provided by the fan 4 and the pump 5 are increased only during operation of the motor in the second operational region in which high torque and high power are required, while the cooling capabilities provided by the fan 4 and the pump 5 are reduced during motor operation in the first operational region, i.e. during steady operation in which only low torque and low output power are required, accordingly it is possible to make the physical sizes of the fan 4 and the pump 5 and of their drive devices 21 and 22 more compact, so that their consumption of electrical power is reduced.

Figure 8:
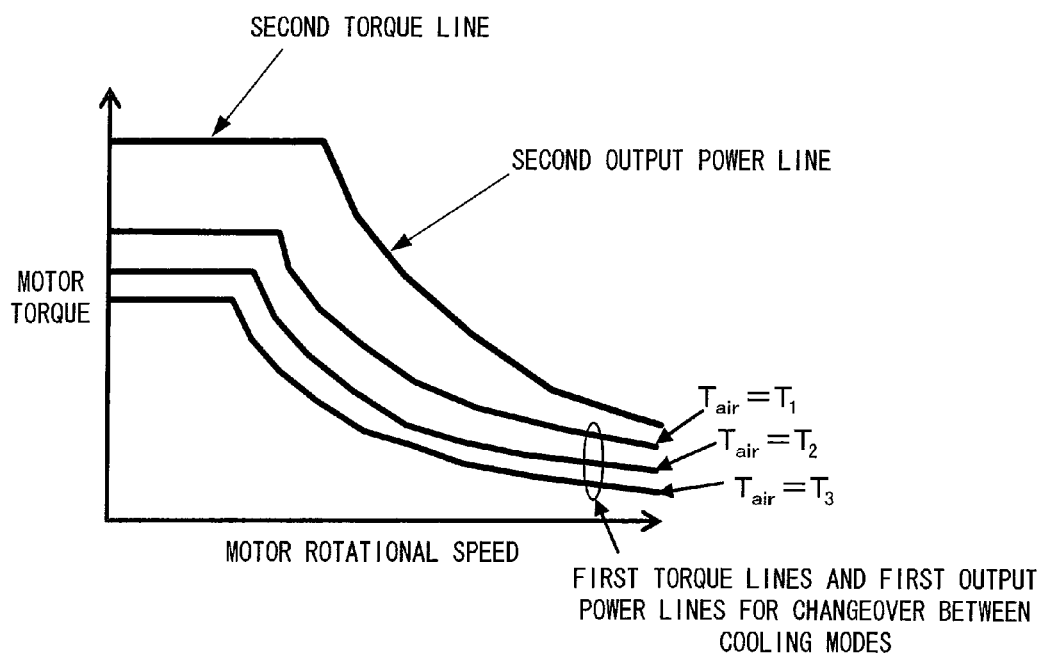
FIG. 8 is a figure showing the way in which the boundary line between the first operational region and the second operational region changes according to external air temperature.

Now, the cooling capability provided by the cooling system is not only determined by the methods according to which the fan 4 and the pump 5 are operated; it also changes according to the temperature of the air that exchanges heat with the cooling medium in the radiator 3, and the higher is the air temperature, the lower is the cooling capability. In other words, the cooling capability is proportional to the difference of temperatures of the cooling medium and the air at the radiator (cooling medium temperature>air temperature). Accordingly, as shown in FIG. 4B, it is desirable to change the boundary line between the first operational region and the second operational region where the first cooling mode and the second cooling mode are changed over, in other words the first torque line and the first output power line, according to the air temperature as shown in FIG. 8, in other words according to the external air temperature Tair. That is to say, as the external air temperature Tair rises through T1, T2, and T3 (T1<T2<T3), the torque upon the first torque line and the output power upon the first output power line become lower, and this makes it easier for changeover to the second cooling mode according to the external air temperature Tair becoming higher and the cooling capability becoming lower to occur, so that this compensates for decrease of the cooling capability that accompanies elevation of the external air temperature. It should be understood that the external air temperature Tair is detected by the external air temperature sensor 31 shown in FIG. 1 as being the temperature of the air blown against the radiator 3.

Figure 9:
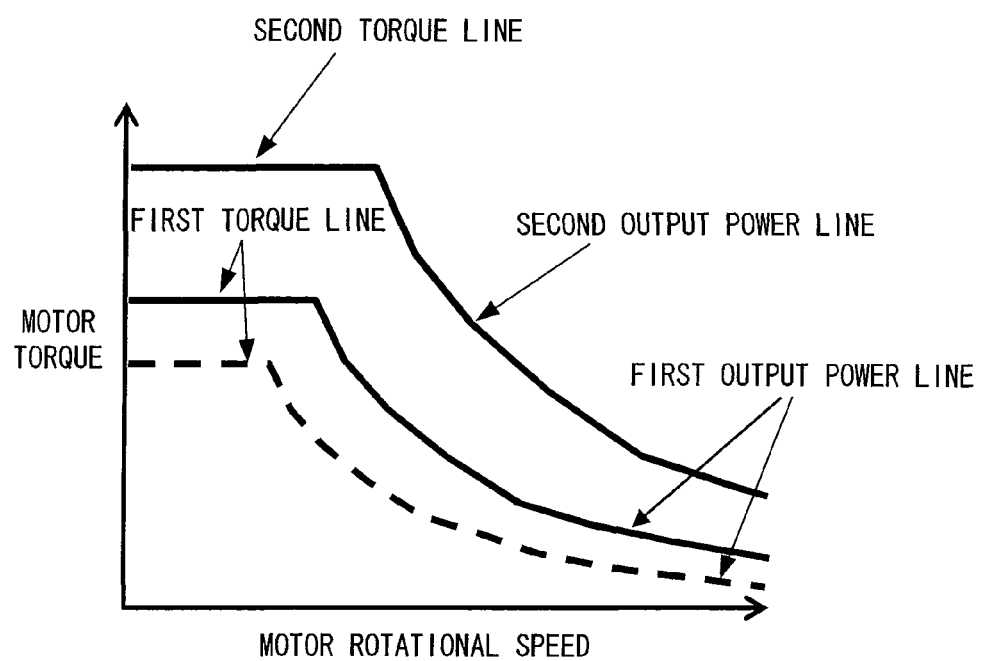
FIG. 9 is a figure for explanation of a method for preventing changeover hunting between the first operational region and the second operational region.

It would also be acceptable, in order to prevent hunting during changeover between the first cooling mode and the second cooling mode, as shown in FIG. 9, to arrange to set two boundary lines (i.e. the solid line and the broken line) between the first operational region and the second operational region, in other words to set two first torque lines and first output power lines; and, in this case, the decision as to changeover from the first operational region to the second operational region would be performed according to the one first torque line and the one first output power line as given by the solid line, while the decision as to changeover from the second operational region to the first operational region would be performed according to the other first torque line and the other first output power line as given by the broken line. Or, alternatively, in order to prevent hunting during changeover between the first cooling mode and the second cooling mode, it would also be acceptable only to have one first torque line and one first output power line, and to arrange, after a changeover from the second cooling mode to the first cooling mode has occurred, to prohibit the reverse changeover from the second operational region to the first operational region for a predetermined period of time, even if such a changeover is required.

Embodiment 2

Figure 10:
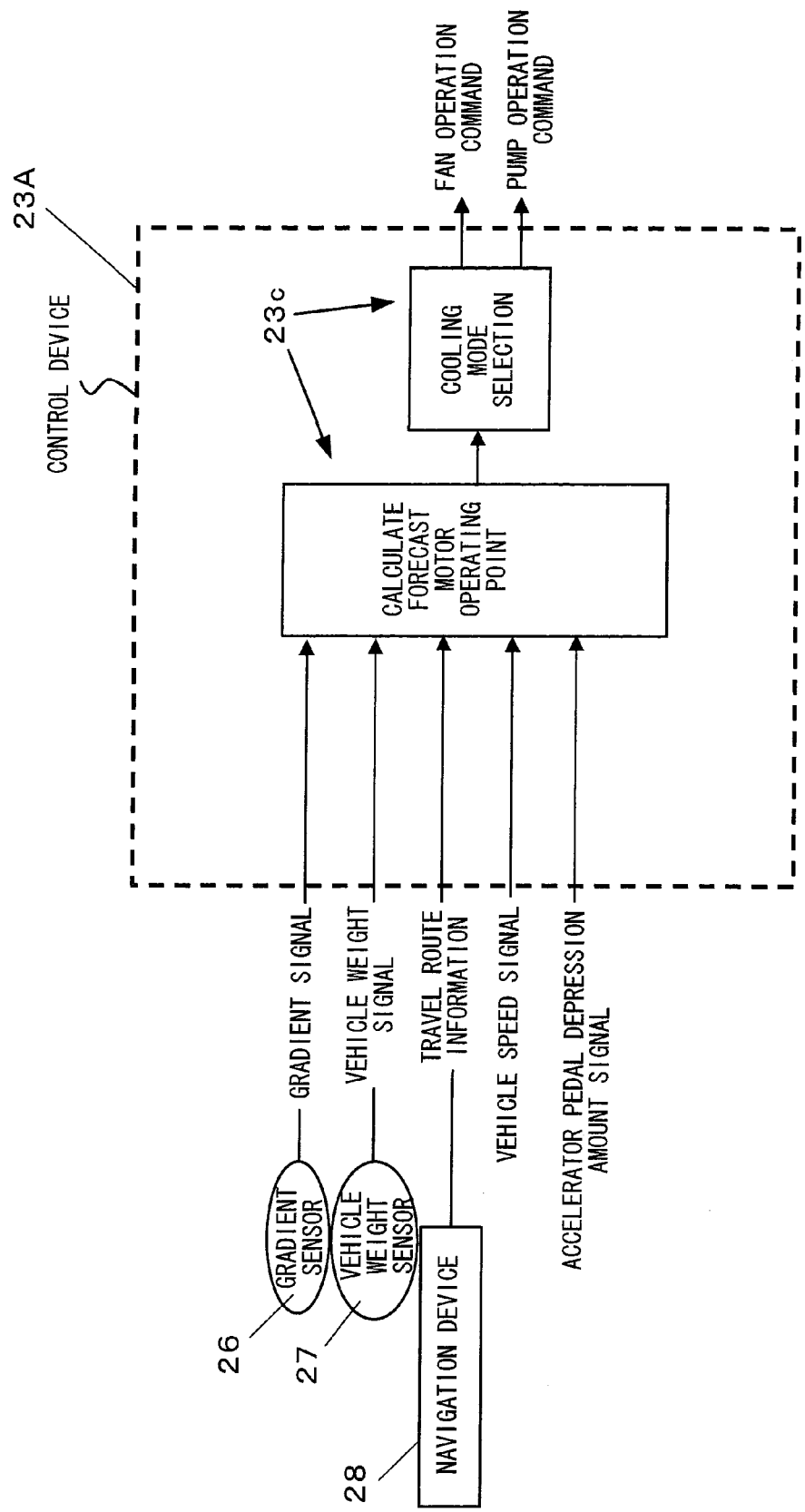
FIG. 10 is a block diagram showing cooling mode selection control in a second embodiment.

In the first embodiment described above, an example was shown in which the operating point of the motor was calculated in real time on the basis of the vehicle speed signal and the accelerator pedal depression amount signal, and the operational region of the motor 1 was determined and the cooling mode was changed over based thereupon; but now a second embodiment of the present invention will be explained in which the operating point of the motor 1 is forecast in advance, and the operational region of the motor 1 is determined and the cooling mode is changed over according to the result of this forecasting of the motor operating point. FIG. 10 is a block diagram showing cooling mode selection control in this second embodiment. It should be understood that, apart from the control of selection of cooling mode, this second embodiment is the same as the first embodiment described above, and accordingly detailed description of overlapping portions thereof and figures relating thereto will be omitted.

In this second embodiment, apart from the vehicle speed sensor 24 and the accelerator sensor 25 shown in FIG. 1, a gradient sensor 26 that detects the road gradient, a vehicle weight sensor 27 that detects the weight of the vehicle, and a navigation device 28 that calculates travel route information are also connected to the control device 23A. The navigation device 28 includes a GPS receiver, a VICS (Vehicle Information and Communication System) receiver, a road map data storage device (none of which are shown in the figures), and so on, and, along with searching for an optimum path (i.e. a recommended path) from the current position of the vehicle to a destination, also detects the current position, the road gradient along the recommended path, the average vehicle speed, the state of traffic jam, and so on. And the control device 23A forecasts the operating point of the motor 1 along the recommended path to the destination by calculating its torque and its rotational speed on the basis of the recommended path information the gradient information, and the traffic jam information inputted from the navigation device 28, and on the basis of the vehicle weight and so on inputted from the vehicle weight sensor 27, and thereby determines the operational region. The operational regions of the motor 1 along this road upon the recommended path are stored in the memory 23m of the control device 23A (refer to FIG. 1).

Figure 11:
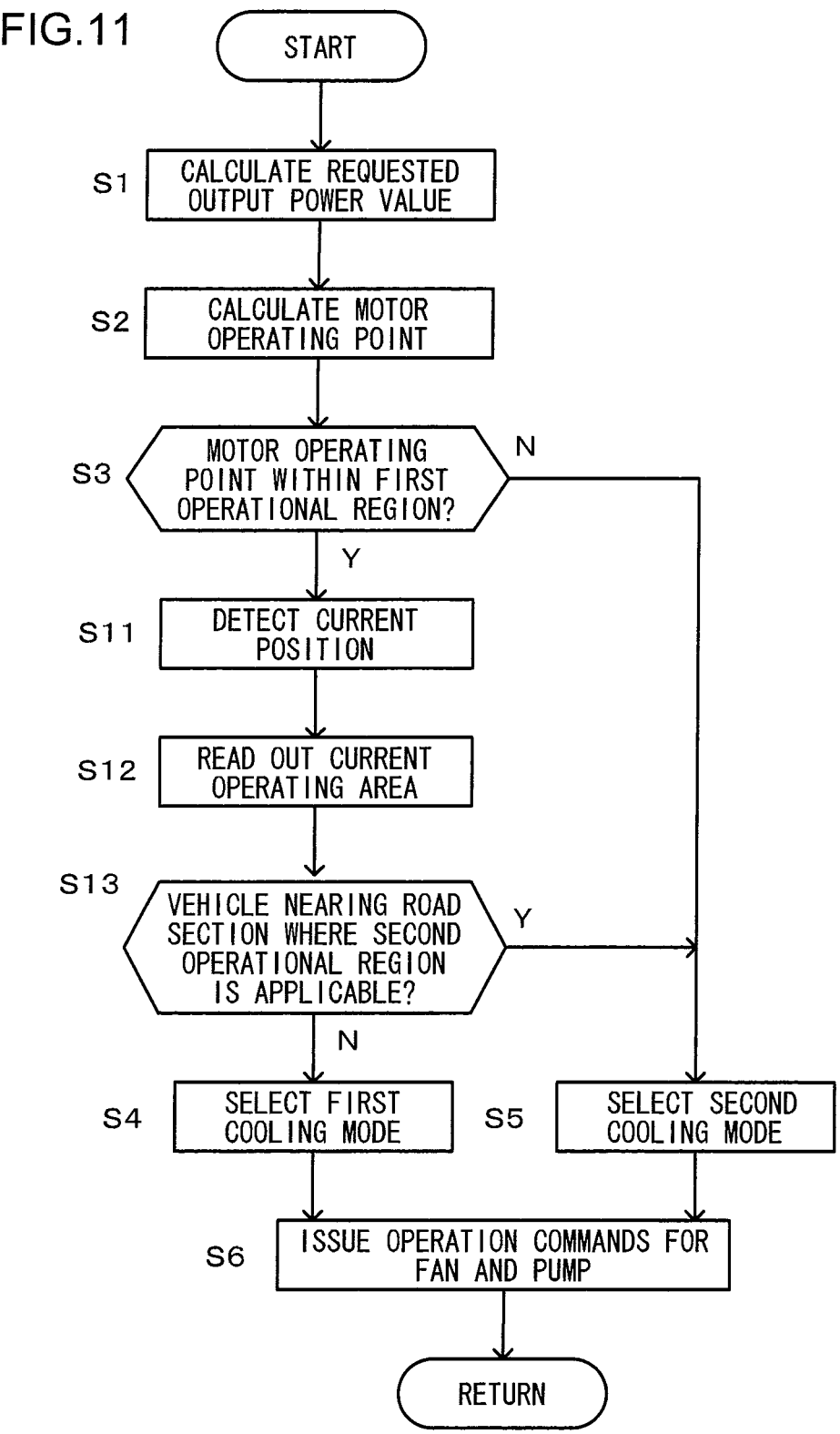
FIG. 11 is a flow chart showing a cooling mode selection control program of the second embodiment.

FIG. 11 is a flow chart showing a cooling mode selection control program of this second embodiment. The CPU 23c of the control device 23A executes the cooling mode selection control program shown in FIG. 11 repeatedly while an ignition switch of the vehicle (not shown in the figures) is turned ON. It should be understood that, here, the same step numbers are affixed to control steps that are the same as control steps of the cooling mode selection control program in the first embodiment shown in FIG. 7, and the following explanation will focus upon the points of difference. As described above, in the steps S1 through S3, the output power value requested for the motor 1 is calculated on the basis of the vehicle speed signal and the accelerator pedal depression amount signal, and, according to the vehicle speed and the accelerator pedal depression amount, a judgment is done is done as to whether the operating point of the motor 1 currently falls within the first operational region or within the second operational region. If it has been judged that the operating point is currently within the first operational region, then the flow of control proceeds to a step S11, whereas if it has been judged that the operating point is currently within the second operational region, then the flow of control is transferred to a step S5.

If it has been judged on the basis of the speed and the accelerator pedal depression amount of the electric vehicle that the operating point of the motor 1 is currently within the first operational region, then in the step S11 the current position of this electric vehicle is detected by the navigation device 28, and then in the next step S12 the operational region data around this current vehicle position is read out from the memory 23m. Then in a step S13 it is determined whether or not the electric vehicle is near a road section for which the second operational region will be applied. For example, it may be determined whether or not any road section for which the second operational region will be applied is present within a predetermined distance in the forwards direction along the recommended path from the current position of this electric vehicle, and, if such a road section for which the second operational region will be applied is present within the predetermined distance forward from the vehicle, then the flow of control is transferred to a step S5, whereas if no such road section is present, then the flow of control is transferred to a step S4.

If it has been judged on the basis of the speed and the accelerator pedal depression amount of the electric vehicle that the operating point of the motor 1 is within the first operational region, and moreover that no road section is present within the predetermined distance forwards upon the recommended path for which the second operational region will be applied, then in the step S4 the first cooling mode is selected. On the other hand if it has been judged, on the basis of the speed and the accelerator pedal depression amount of the electric vehicle, that the operating point of the motor 1 is not within the first operational region, in other words that it is within the second operational region, or if, although the operating point of the motor 1 is within the first operational region, some road section for which the second operational region will be applied is coming closer within the predetermined distance forwards upon the recommended path, then in the step S5 the second cooling mode is selected. Finally in the step S6, according to the result of cooling mode selection, an operation command is sent to the fan drive device 21 for operation of the fan 4 in either the first cooling mode or the second cooling mode, and also an operation command is sent to the pump drive device 22 for operation of the pump 5 in either the first cooling mode or the second cooling mode.

Since, according to this second embodiment of the present invention, the operational region of the motor 1 along the road to the destination is forecast in advance, and, if it is forecast that the motor 1 and the inverter power supply 2 will soon be operating in the second operational region in which the amount of heat generated is great, then it is possible to perform changeover from the first cooling mode to the second cooling mode that provides a high cooling capability, a predetermined distance before the road section for which the second operational region will be applied, accordingly it is possible to keep the temperature elevation of the motor 1 and the inverter power supply 2 upon this road section where the second operational region is applied lower than their upper limit temperatures. To put this in another manner, a certain clearance is allowed before the upper limit temperatures are arrived at, and it is possible to set the rated short-time rated maximum torque and maximum output power regulated by the second torque line and the second output power line shown in FIG. 4B to yet larger values.

Embodiment 3

Figure 12:
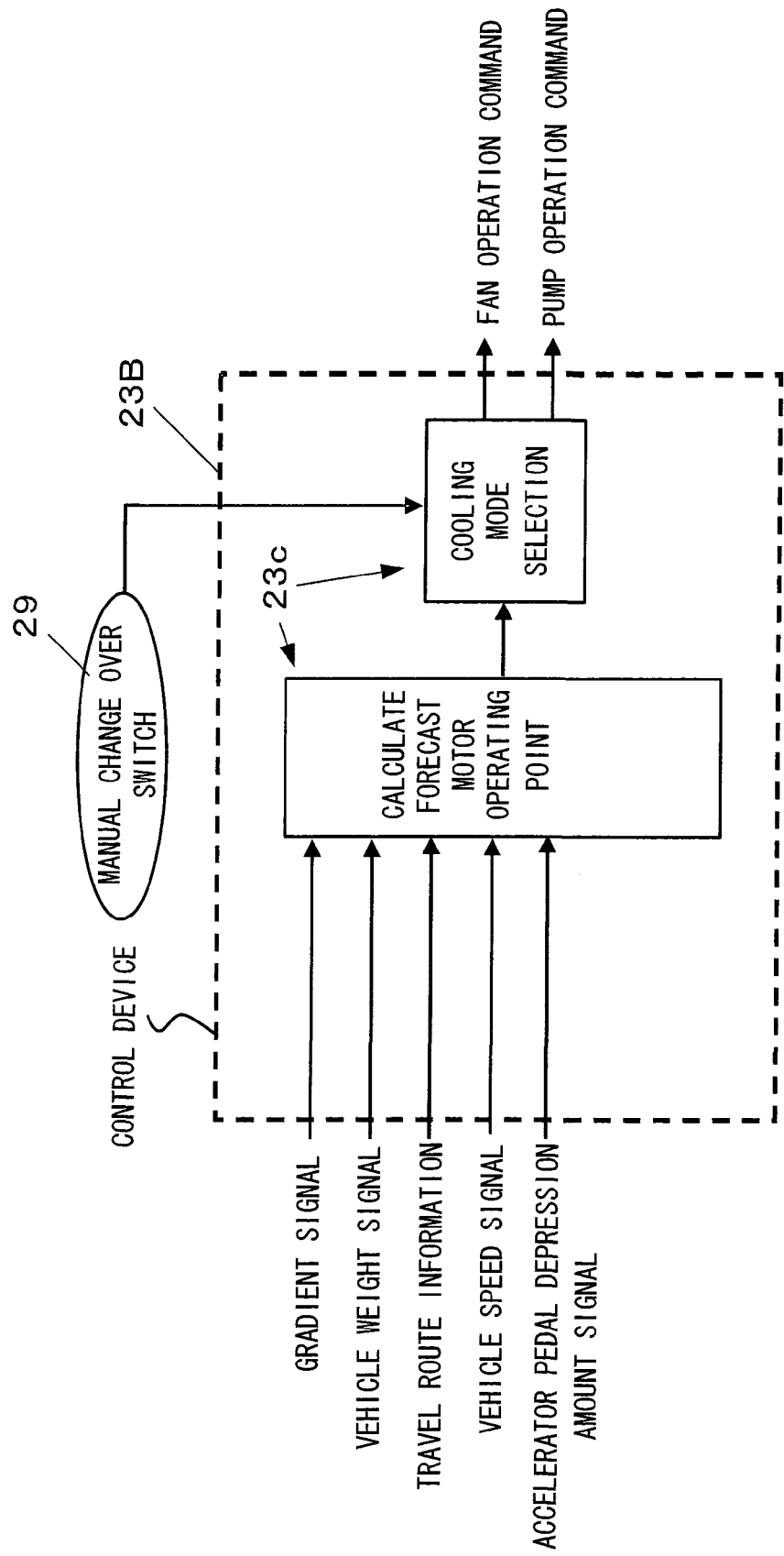
FIG. 12 is a block diagram showing cooling mode selection control in a third embodiment.

A third embodiment of the present invention will now be explained, in which a manual cooling mode selection function is added to the above described first and second embodiments. FIG. 12 is a block diagram showing the cooling mode selection control in this third embodiment. In this third embodiment, in addition to the structure of the second embodiment shown in FIG. 10, also a manual changeover switch 29 is connected to the control device 23B. This manual changeover switch 29 is a switch for the driver of the electric vehicle to select the cooling mode manually.

Figure 13:
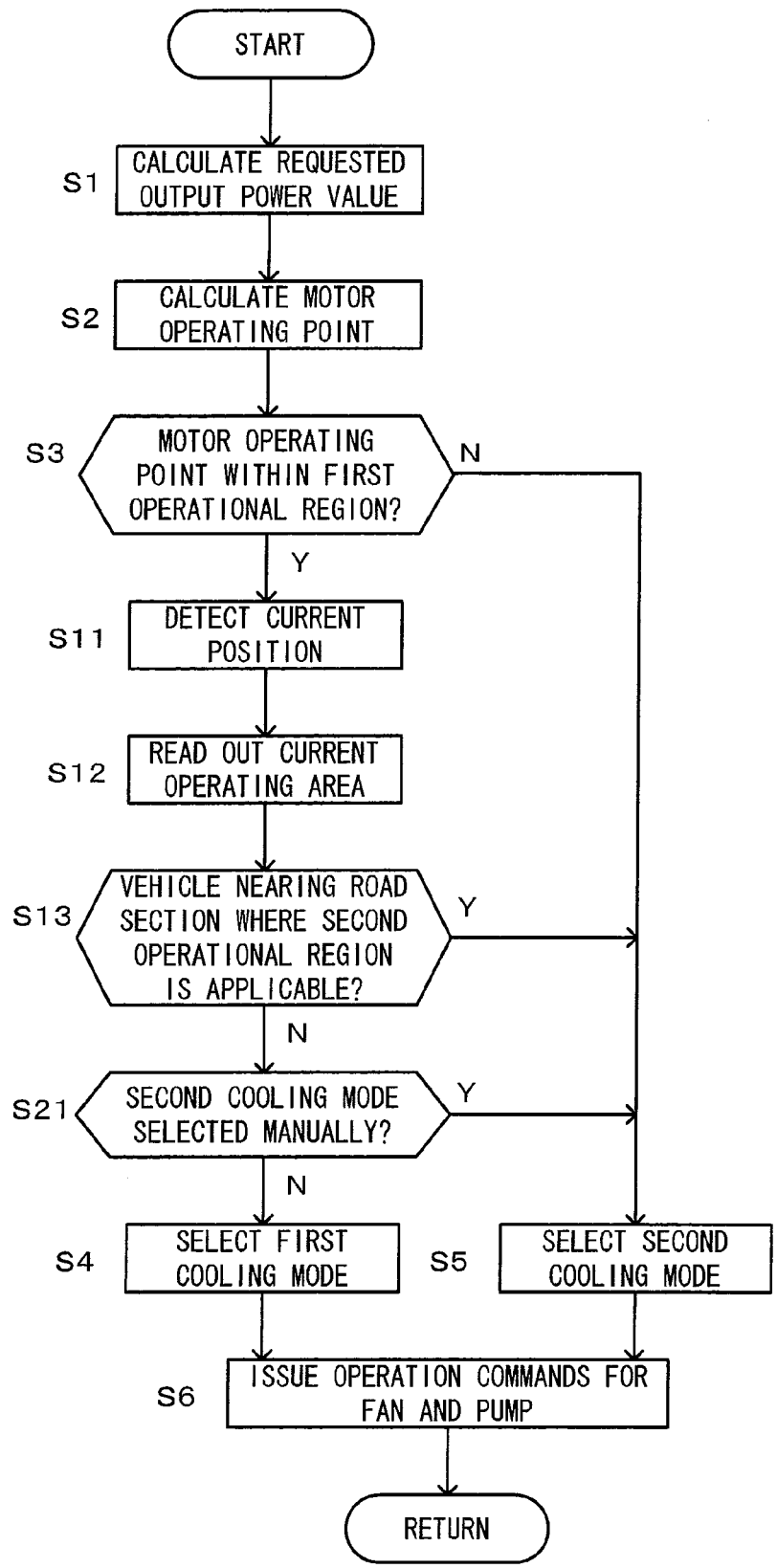
FIG. 13 is a flow chart showing a cooling mode selection control program of the third embodiment.

FIG. 13 is a flow chart showing the cooling mode selection control program of this third embodiment. The CPU 23c of the control device 23B executes the cooling mode selection control program shown in FIG. 13 repeatedly while an ignition switch of the vehicle (not shown in the figures) is turned ON. It should be understood that, here, the same step numbers are affixed to control steps that are the same as control steps of the cooling mode selection control programs in the first and second embodiments shown in FIGS. 7 and 11, and the following explanation will focus upon the points of difference. As described above, in the steps S1 through S3, the output power value requested for the motor 1 is calculated on the basis of the vehicle speed signal and the accelerator pedal depression amount signal, and, according to the vehicle speed and the accelerator pedal depression amount, a decision is made as to whether the operating point of the motor 1 currently falls within the first operational region or within the second operational region. If it has been judged that the operating point is currently within the first operational region, then the flow of control proceeds to a step S11, whereas if it has been judged that the operating point is currently within the second operational region, then the flow of control is transferred to a step S5.

If it has been judged on the basis of the speed and the accelerator pedal depression amount of the electric vehicle that the operating point of the motor 1 is currently within the first operational region, then in the step S11 the current position of this electric vehicle is detected by the navigation device 28, and then in the next step S12 the operating region data around this current vehicle position is read out from the memory 23m. Then in the step S13 it is judged whether or not the electric vehicle is near a road section for which the second operational region will be applied. If such a road section for which the second operational region will be applied is present within the predetermined distance forward from the vehicle, then the flow of control is transferred to the step S5, whereas if no such road section is present, then the flow of control is transferred to a step S21.

If it has been judged on the basis of the speed and the accelerator pedal depression amount of the electric vehicle that the operating point of the motor 1 is within the first operational region, and moreover that no road section is present within the predetermined distance forwards upon the recommended path for which the second operational region will be applied, then in the step S21 it is determined whether or not the second cooling mode is being selected with the manual changeover switch 29, and if the second cooling mode is thus being selected manually then the flow of control is transferred to the step S5, whereas if the first cooling mode is being selected then the flow of control is transferred to the step S4. Thus the first cooling mode is selected in the step S4, if it has been judged by the control device 23B that the operating point of the motor 1 is within the first operational region, and moreover that at the current vehicle position no road section is present within the predetermined distance forwards upon the recommended path for which the second operational region will be applied, and also that the first cooling mode is being selected manually.

On the other hand, if it has been judged on the basis of the speed and the accelerator pedal depression amount of the electric vehicle that the operating point of the motor 1 is not within the first operational region, in other words if it has been judged that the operating point is within the second operational region, or if it has been judged that, even though the operating point of the motor 1 at the current vehicle position is within the first operational region, some road section is coming closer within the predetermined distance forwards upon the recommended path for which the second operational region will be applied, or if the second cooling mode has been selected manually, then in the step S5 the second cooling mode is selected. Finally in the step S6, according to the result of cooling mode selection, an operation command is sent to the fan drive device 21 for operation of the fan 4 in either the first cooling mode or the second cooling mode, and also an operation command is sent to the pump drive device 22 for operation of the pump 5 in either the first cooling mode or the second cooling mode.

Since, according to this third embodiment of the present invention, it is arranged for the second cooling mode to be selected when the driver has manually selected that second cooling mode, irrespective of the results of determination of cooling mode by the control device 23B, and it is arranged for the first cooling mode to be selected if the result of manual selection of cooling mode and also the result of determination of cooling mode by the control device 23B are both the first cooling mode, accordingly it is possible to perform cooling in the second cooling mode that provides a high cooling capability while according priority to the wishes of the driver of this electric vehicle, when he considers that he wishes to increase the cooling capability according to his driving preferences, or according to the weather conditions while driving or the traveling conditions or the like; and thus it has been possible effectively to supplement a manual selection function to the automatic cooling mode selection function provided in the first and the second embodiments.

Embodiment 4

Figure 14:
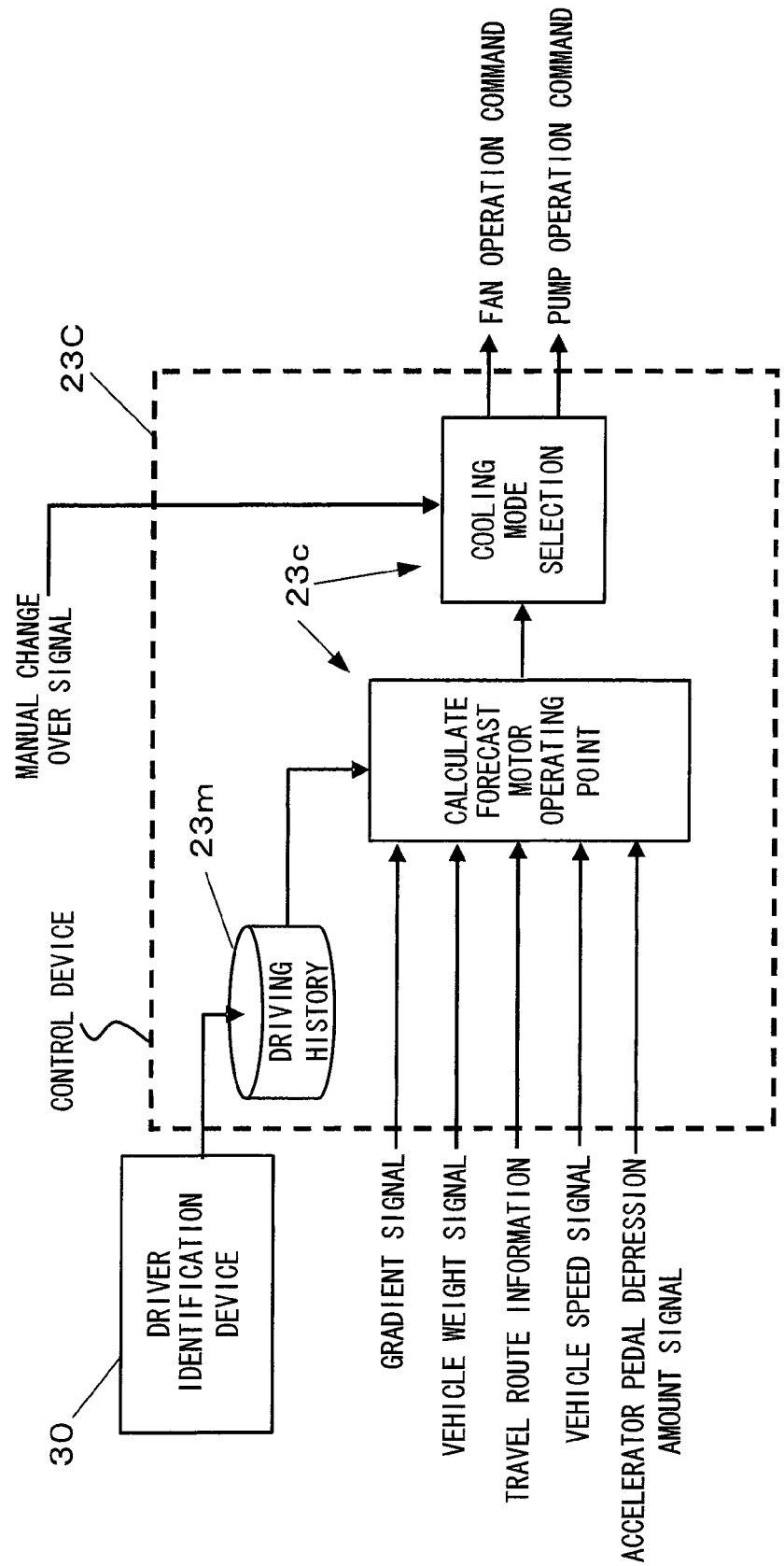
FIG. 14 is a block diagram showing cooling mode selection control in a fourth embodiment.

A fourth embodiment of the present invention will now be explained, in which it is arranged to change over the boundary line between the first operational region and the second operational region at which change between the first cooling mode and the second cooling mode is performed, according to the driving history of each driver of the electric vehicle. FIG. 14 is a block diagram showing cooling mode selection control in this fourth embodiment. In this fourth embodiment, in addition to the structure of the third embodiment shown in FIG. 12, along with a driver identification device 30 being connected to the control device 23C, driving history data in the past for each driver is stored in the memory 23*m* of the control device 23C. It should be understood that the control of selection of cooling mode in this fourth embodiment is the same as that in the first through the third embodiments described above, and accordingly detailed description thereof and flow charts and figures and so on relating thereto will be omitted.

The driver identification device 30 identifies the driver who is operating this electric vehicle. Identification methods for the driver that may be considered are attaching an IC chip to the driving license of each driver and reading in data from this IC chip, providing a different ignition key for each driver of the electric vehicle and storing his ID on that key, reading in an ID of the driver, and so on. The memory 23*m* of the control device 23C stores the driving history of each driver who has been identified. For example, for a driver who has a tendency to accelerate harder than the average driver, a greater torque and output power are required than in the case of an average driver, and, since the frequency of operation in the second operational region is greater, accordingly the first torque line and the first output power line at which the cooling modes change over are changed towards the low torque low output power side, so that it becomes easier for the second cooling mode that provides a high cooling capability to be selected. Due to this, for such a driver who has a tendency to accelerate harder than an average driver, the range of the second cooling mode that provides a higher cooling capability is increased even if the motor operating point is the same as in the case of an average driver; and accordingly it is possible to perform cooling of the motor 1 and the inverter power supply 2 with a cooling capability that is matched to the driving characteristics of the driver.

Embodiment 5

Generally, the efficiencies of an electric motor and an inverter power supply change according to their temperatures, and, if the operating point of the motor is the same, in other words if the torque and the rotational speed are the same, the higher are the temperatures of the motor and the inverter power supply, the lower are their efficiencies. Due to this, it is necessary to change the cooling capabilities for a motor and an inverter power supply according to their temperatures. To put this in another manner, it is possible to change the efficiencies of a motor and an inverter power supply by changing their cooling capabilities and thus changing the temperatures of the motor and the inverter power supply. In the prior art, even when the cooling capabilities for a motor and an inverter power supply were changed according to the torque or the output power or according to their temperatures, control of the cooling capabilities was not performed while giving any consideration to changes of the efficiencies due to temperature.

Thus, a fifth embodiment of the present invention will now be explained, in which it is arranged to perform cooling control while taking the efficiencies of auxiliary machinery such as the fan 4 and the pump 5 and so on into account along with the operating efficiencies of the motor 1 and the inverter power supply 2, so that the total of all these efficiencies is considered. It should be understood that, since the loss in the inverter power supply 2 is small as compared to the loss in the motor 1, the cooling control in this fifth embodiment will be explained with principal attention being paid to the temperature of the motor 1 and the loss therein. Furthermore, the cooling mode selection control in this fifth embodiment is the same as the cooling mode selection control in the first through the third embodiments described above, and accordingly detailed description thereof and flow charts and figures and so on relating thereto will be omitted.

Figure 15:
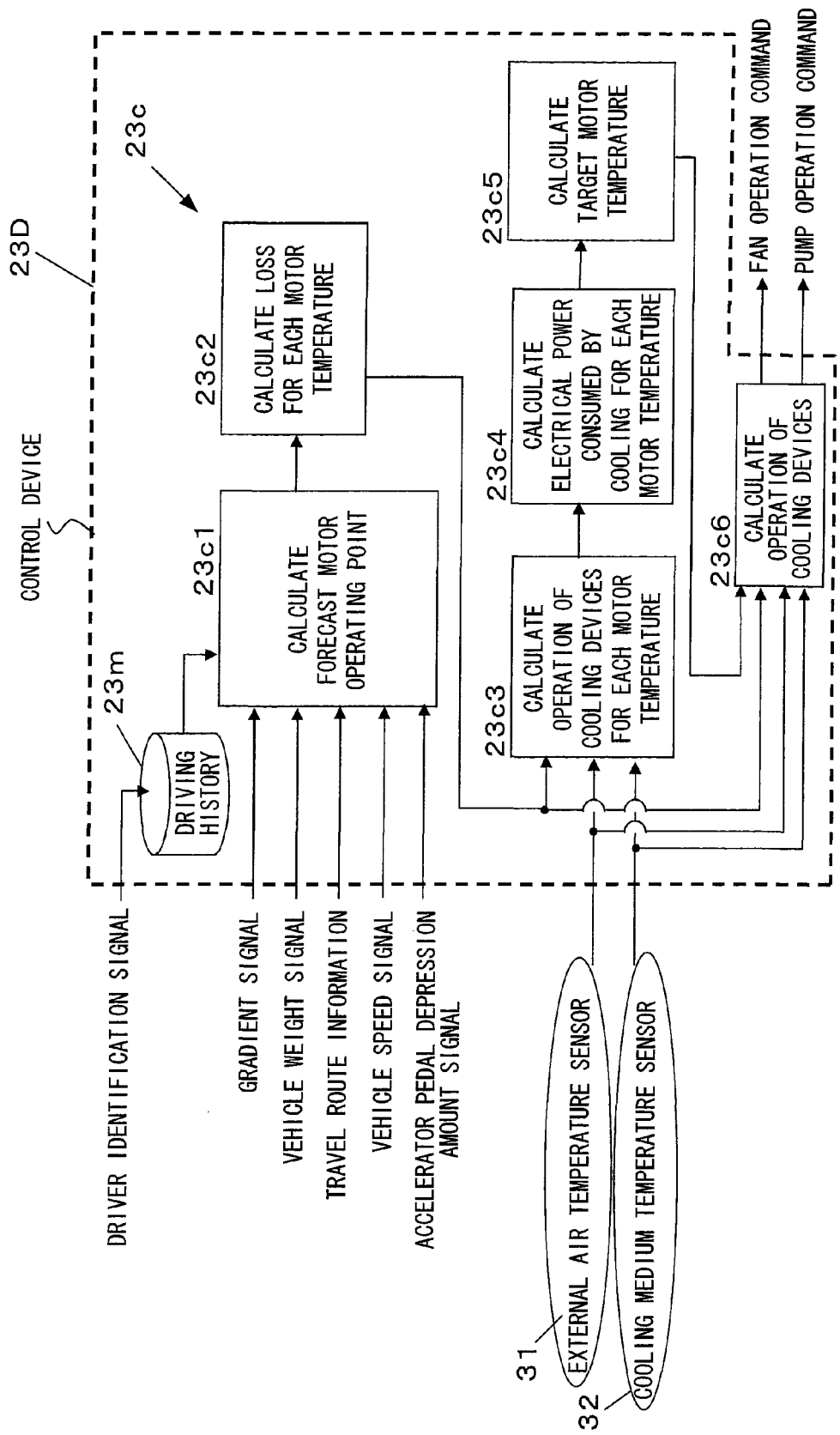
FIG. 15 is a block diagram showing cooling control in a fifth embodiment.

FIG. 15 is a block diagram showing the cooling control in this fifth embodiment. In this fifth embodiment, in addition to the structure of the fourth embodiment shown in FIG. 14, an external air temperature sensor 31 and a cooling medium temperature sensor 32 are connected to the control device 23D, and also control blocks 23c1 through 23c6, which are realized with software installed on the CPU 23c, are provided to the control device 23D. The external air temperature sensor 31 detects the temperature of the air external to the electric vehicle, while the cooling medium temperature sensor 32 detects the temperature of the cooling medium.

First, in the control block 23c1, as described above, calculation is performed for forecasting the operating point of the motor 1. When the operating point and the temperature of the motor 1 are calculated, then the loss of electrical power due to copper loss in the motor 1 and air loss and so on may be obtained, and thus the amount of heat generation entailed by this power loss may be obtained. Thus, next, the loss of electrical power such as copper loss and air loss and so on (i.e. the amount of heat generated) is calculated by the control block 23c2 for each motor temperature when the motor 1 operates at the operating point that is the result of calculation. Next, in the control block 23c3, the operation of the cooling devices (i.e. the fan 4, the pump 5, and their drive control devices 21 and 22) is calculated at each motor temperature. In concrete terms, operating speeds are calculated for the fan 4 and the pump 5 in order to dissipate the amount of heat generated corresponding to the power loss in the electric motor for each motor temperature that is the result of calculation, to air of which temperature is detected by the external air temperature sensor 31, via a cooling medium of which temperature is detected by the cooling medium temperature sensor 32.

Figure 16:
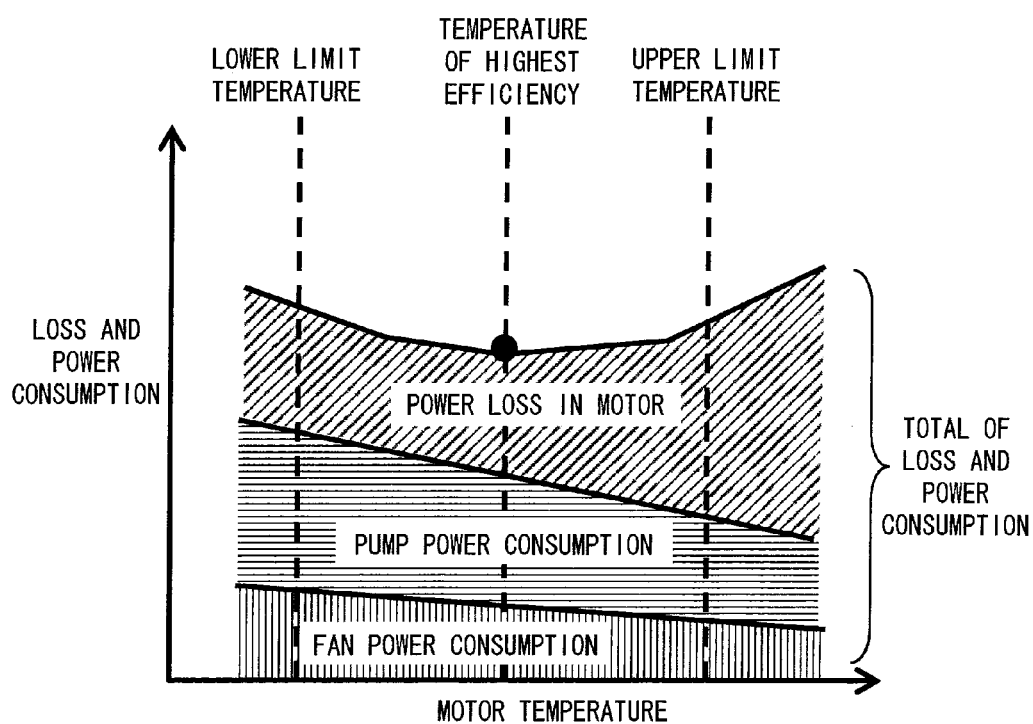
FIG. 16 is a figure for explanation of the motor temperature at which the sum of the loss in an electric motor and the power consumed by a pump and a fan becomes a minimum.

Next, in the control block 23c4, the amount of electrical power consumed by the fan 4, the pump 5, and their drive devices 21 and 22 when the fan 4 and the pump 5 are operated at the operating speeds resulting from the above calculation is calculated. And then, in the control block 23c5, as shown in FIG. 16, for each motor temperature, a sum total is obtained by adding together the power lost in the motor, the power consumed by the fan, and the power consumed by the pump, and that motor temperature (between a lower limit temperature and an upper limit temperature) at which this sum total is minimum is taken as being the temperature of highest efficiency, and is set for the target motor temperature. Finally, in the control block 23c6, the operating speeds for the cooling devices (i.e. for the fan 4 and the pump 5) are calculated in order for the motor temperature to be brought to this calculated target temperature with the current external air temperature and cooling medium temperature, and an appropriate fan operation command and an appropriate pump operation command are sent to the fan drive device 21 and to the pump drive device 22.

According to this fifth embodiment of the present invention, it is possible to drive the electric motor 1, the inverter power supply 2, the fan 4, and the pump 5 at the motor temperature at which the total efficiency is the highest, in consideration of, not only the efficiency of the motor, but also the amounts of electrical power consumed by the cooling devices themselves for their cooling operation, so that it is possible to implement energy saving operation. It should be understood that while, in the example described above, the operational states of the cooling devices were determined only in consideration of the loss in the motor, it would also be acceptable to arrange to determine the operational states of the cooling devices in consideration, not only of the motor loss, but also of the loss in the inverter power supply 2 and possibly also of loss in an electric storage device not shown in the figures.

Embodiment 6

The structure of a sixth embodiment of the cooling system for an electric vehicle according to the present invention will now be explained with reference to FIG. 17. It should be understood that to elements that are the same as ones shown in FIG. 1 the same reference symbols are appended, and the explanation focuses upon the points of difference. Moreover, elements described above such as the fan drive device 21, the pump drive device 22, the control device 23, and devices connected to the control device 23 such as the vehicle speed sensor 24 and the accelerator sensor 25 and so on are omitted from FIG. 17, and explanation thereof is also omitted. This cooling system for an electric vehicle according to the sixth embodiment includes a first cooling system that dissipates heat in the cooling medium to the external air, and a second cooling system that cools the motor 1 and the inverter power supply 2 by performing heat exchange with this first cooling system via a heat exchanger 8.

First, the second cooling system includes a pump 5, a cooling medium circulation path 6b, the heat exchanger 8, and the motor 1 and the inverter power supply 2 that are the subjects for cooling, with the cooling medium circulation path 6b circulating the cooling medium around the path: pump 5→heat exchanger 8→inverter power supply 2→motor 1→pump 5. The cooling medium expelled from the pump 5 is cooled by performing heat exchange with the cooling medium of the first cooling system in the heat exchanger 8, and then returns to the pump 5 while cooling the inverter power supply 2 and the motor 1.

Next, the first cooling system includes a radiator 3, a fan 4, a cooling medium circulation path 6a, a compressor 7, the heat exchanger 8, and a control valve 9, with the cooling medium circulation path 6a circulating the cooling medium around the path: heat exchanger 8→compressor 7→radiator 3→control valve 9→heat exchanger 8. This first cooling system is a refrigeration cycle, and employs a cooling medium for a refrigeration cycle like HFC-134a or the like as the first cooling medium, with the radiator 3 functioning as a condenser, the control valve 9 functioning as an expansion valve, and the heat exchanger 9 functioning as an evaporator. The first cooling medium, after having absorbed the heat of the second cooling medium in the second cooling system, is compressed by the compressor 7, and, after having been cooled by air blown through the radiator 3 by the fan 4, passes through the control valve 9 and is then returned to the heat exchanger 8.

With the first embodiment shown in FIG. 1, it is not possible to lower the temperature of the cooling medium below the temperature of the air that is blown through the radiator 3 by the fan 4, because the heat absorbed by the cooling medium while cooling the motor 1 and the inverter power supply 2 that are the subjects of cooling is dissipated in the radiator 3 by heat exchange with this air. By contrast since, in this sixth embodiment of the present invention, the heat absorbed by the second cooling medium in the second cooling system while cooling the motor 1 and the inverter power supply 2 that are the subjects of cooling is dissipated to the first cooling medium in the first cooling system by the heat exchanger 8, and then this heat in the first cooling medium is dissipated to the air passing through the radiator 3 by the first cooling system that employs a refrigeration cycle, accordingly it is possible to lower the temperature of the second cooling medium to below the ambient air temperature, so that it is possible further to enhance the cooling capability.

It should be understood that, in this sixth embodiment, in addition to the devices incorporated in the cooling system of the first embodiment, there are also provided a compressor 7 and a control valve 9, and these constitute control objects. The operation of this sixth embodiment will be described hereinafter, in terms of the operation of a cooling system that is mounted to an electric vehicle.

Variant of Embodiment 6

Figure 17:
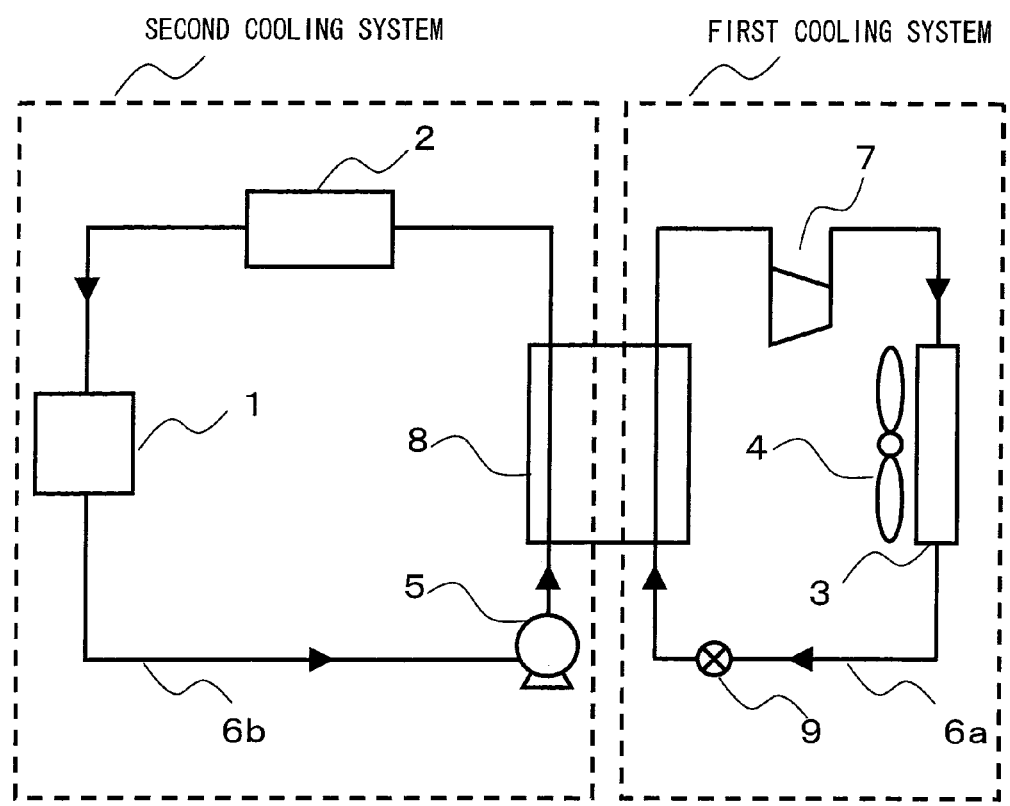
FIG. 17 is a figure showing the structure of a cooling system for an electric vehicle according to a sixth embodiment.
Figure 18:
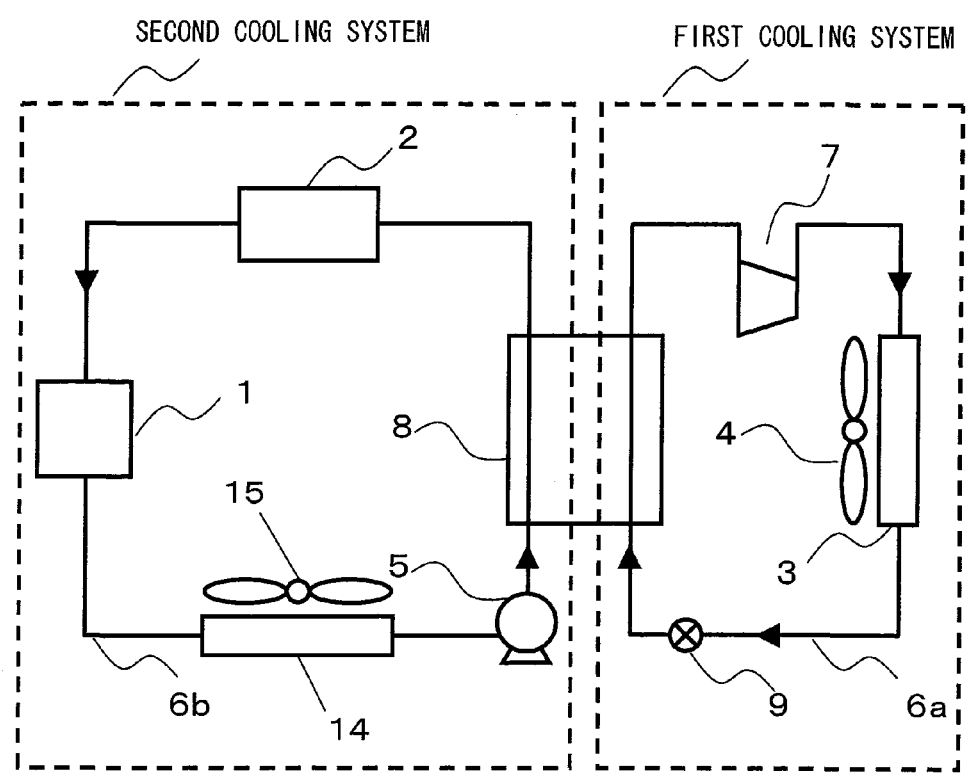
FIG. 18 is a figure showing the structure of a cooling system for an electric vehicle according to a variant of this sixth embodiment.

FIG. 18 shows the structure of a variant of the sixth embodiment of the cooling system for an electric vehicle according to the present invention shown in FIG. 17. It should be understood that to elements that are the same as ones shown in FIG. 17 the same reference symbols are appended, and the explanation focuses upon the points of difference. In this variant embodiment, another radiator 14 and another fan 15 are installed between the motor 1 and the pump of the second cooling system. It should be understood that in FIG. 18, a drive device for the fan 15 is omitted. If a malfunction occurs with the fan 4, or the compressor 7, or the control valve 9 or the like of the first cooling system, so that the cooling capability for the motor 1 and the inverter power supply 2 has been reduced, then air is blown through the radiator 14 by the fan 15, thus dissipating the heat in the second cooling medium of the second cooling system and ensuring a similar cooling capability to that obtained in the case of the first embodiment shown in FIG. 1. In this manner, it is possible to continue operating the electric vehicle even if a malfunction of the first cooling system has occurred. It should be understood that it would also be acceptable to perform cooling of the second cooling medium with the radiator 14 and the fan 15 at all times, i.e. not only when a malfunction of the first cooling system has occurred.

Embodiment 7

Figure 19:
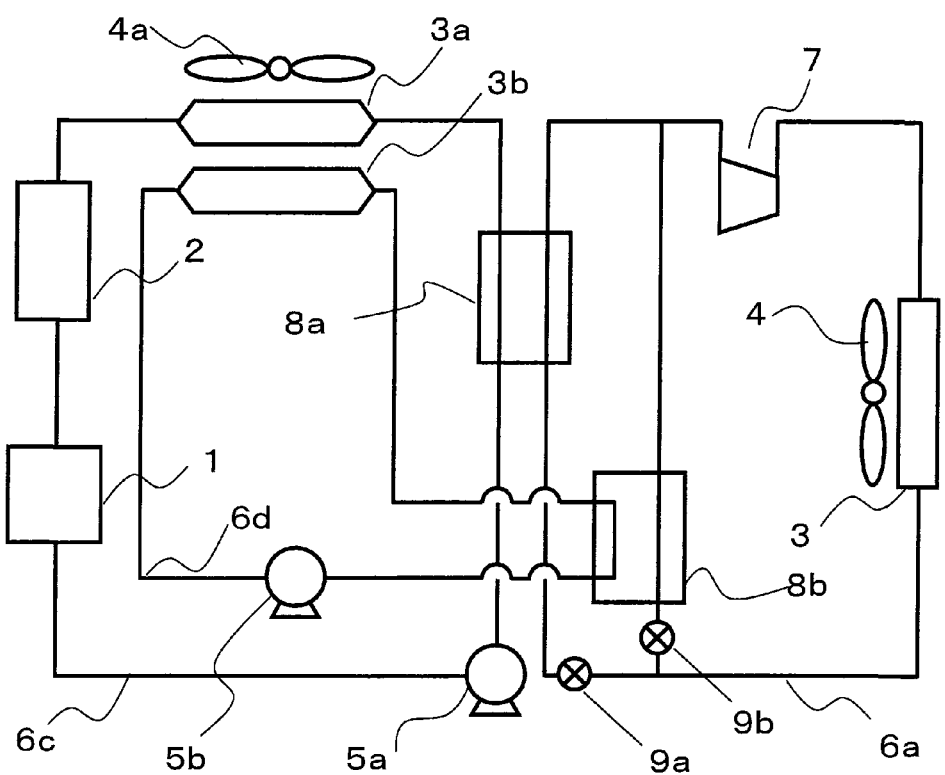
FIG. 19 is a figure showing the structure of a cooling system for an electric vehicle according to a seventh embodiment.

The structure of a seventh embodiment of the cooling system for an electric vehicle according to the present invention is shown in FIG. 19. It should be understood that to elements that are the same as ones shown in FIGS. 1 and 17 the same reference symbols are appended, and the explanation focuses upon the points of difference; and moreover, elements described above such as the fan drive device 21, the pump drive device 22, the control device 23, and devices connected to the control device 23 such as the vehicle speed sensor 24 and the accelerator sensor 25 and so on are omitted from FIG. 19, and explanation thereof is also omitted. In this seventh embodiment, by contrast with the sixth embodiment shown in FIG. 17, the second cooling system is divided into two paths: a circulation path 6c for cooling the devices that are the subjects for cooling, and a circulation path 6d for air conditioning the interior of the vehicle passenger compartment.

First, upon the circulation path 6c for cooling the devices that are the subjects for cooling, after the second cooling medium has been expelled from a pump 5a and has passed through a heat exchanger 8a so that its heat has been dissipated to the first cooling medium of the first cooling system, it then cools the interior of the vehicle passenger compartment due to absorption of heat from the air inside the passenger compartment that is blown through a radiator 3a by a fan 4a, and then is conducted to the inverter power supply 2 and the motor 1 that are the subjects for cooling in that order, and cools them. Moreover, upon the circulation path 6d for air conditioning the interior of the vehicle passenger compartment, after the second cooling medium has been expelled from a pump 5b and has passed through a heat exchanger 8b so that its heat has been dissipated to the first cooling medium of the first cooling system, it then cools the interior of the vehicle passenger compartment due to absorption of heat from the air inside the passenger compartment, that is blown through a radiator 3b by the fan 4a.

On the other hand, the first cooling system is separated into two paths that perform heat exchange with the second cooling medium, and the control valve 9a and the heat exchanger 8a are provided upon a circulation path for cooling the subjects for cooling, while the control valve 9b and the heat exchanger 8b are provided upon another circulation path for air conditioning the interior of the vehicle passenger compartment. The other features, i.e. the radiator 3, the fan 4, and the compressor 7 are the same as those of the first cooling system of the sixth embodiment as shown in FIG. 17.

According to this seventh embodiment, it is not the case that separate refrigeration cycles are provided for cooling the subjects for cooling such as the motor 1 and the inverter power supply and so on, and for air conditioning the interior of the vehicle passenger compartment; rather, it is possible to implement cooling of the devices for driving the electric vehicle such as the motor 1 and the inverter power supply and so on, and air conditioning the interior of the vehicle passenger compartment, with a single refrigeration cycle.

Variant of Embodiment 7

Figure 20:
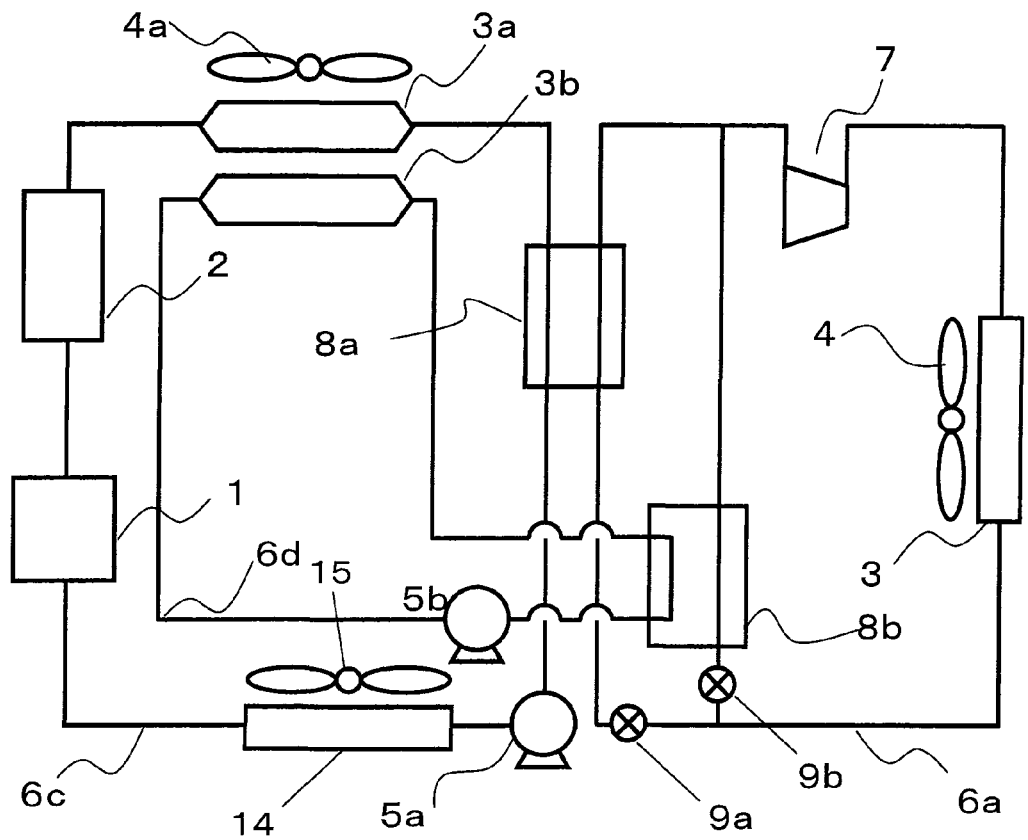
FIG. 20 is a figure showing the structure of a cooling system for an electric vehicle according to a variant of this seventh embodiment.

The structure of a variant of the seventh embodiment of the cooling system for an electric vehicle according to the present invention described above together with FIG. 19 is shown in FIG. 20. It should be understood that to elements that are the same as ones shown in FIG. 19 the same reference symbols are appended, and the explanation focuses upon the points of difference. In this variant embodiment, in the second cooling system, a radiator 14 and a fan 15 are installed between the motor 1 and the pump 5a of the circulation path 6c for cooling the subjects for cooling. It should be understood that, in FIG. 20, a drive device for the fan 15 is omitted. If a malfunction should occur in any of the fan 4, the compressor 7, the control valve 9 and so on included in the first cooling system so that the capability for cooling the motor 1 and the inverter power supply 2 should be reduced, then heat in the second cooling medium of the second cooling system is dissipated to air that is blown by the fan 15 through the radiator 14, and a similar level of cooling capacity to that provided by the first embodiment shown in FIG. 1 is still provided. Due to this, it is still possible to continue operation of the electric vehicle, even if a malfunction should occur in the first cooling system.

Embodiment 8

Figure 21:
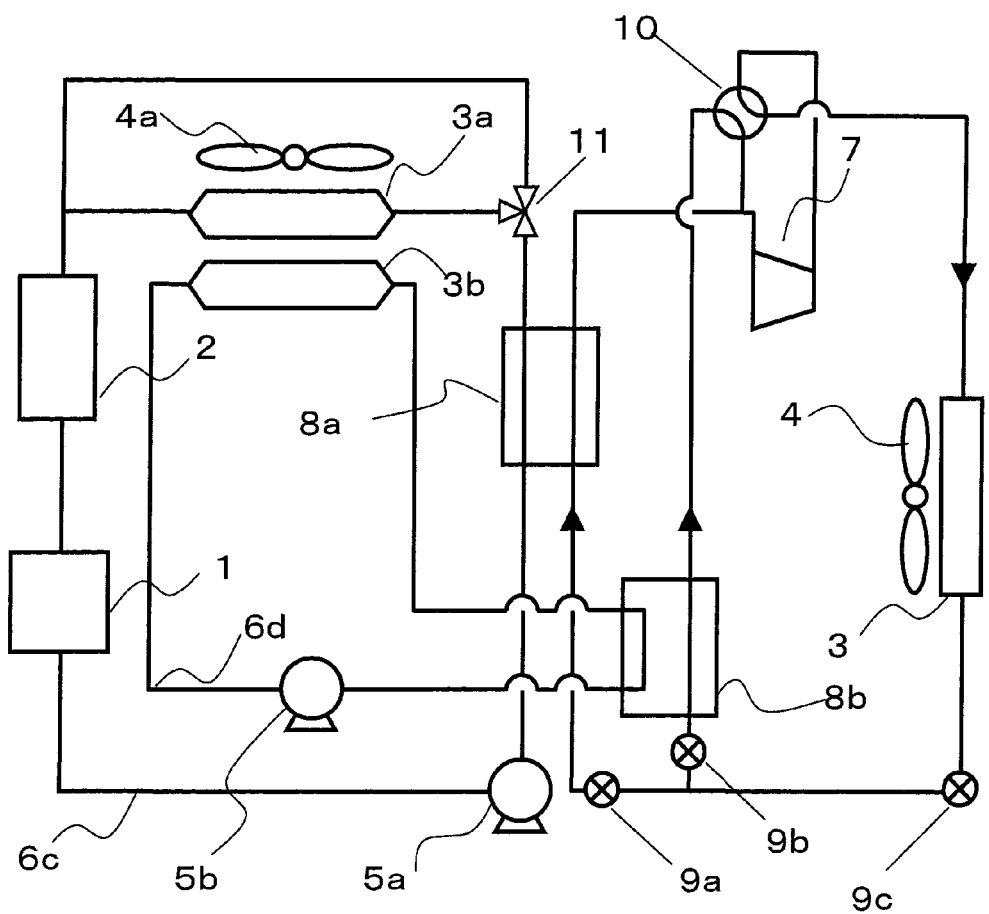
FIG. 21 is a figure showing the structure of a cooling system for an electric vehicle according to an eighth embodiment.

The structure of an eighth embodiment of the cooling system for an electric vehicle according to the present invention is shown in FIG. 21. It should be understood that to elements that are the same as ones shown in FIGS. 1 and 19 the same reference symbols are appended, and the explanation focuses upon the points of difference; and moreover, elements described above such as the fan drive device 21, the pump drive device 22, the control device 23, and devices connected to the control device 23 such as the vehicle speed sensor 24 and the accelerator sensor 25 and so on are omitted from FIG. 21, and explanation thereof is also omitted. In this eighth embodiment, in contrast to the seventh embodiment shown in FIG. 19, by installing a four-way valve 10 at the discharge side of the compressor 7, and by changing over the direction of circulation of the cooling medium in the refrigeration cycle, it is possible to provide operation for heating the interior of the passenger compartment, in addition to air conditioning operation. The arrow signs in FIG. 21 indicating a direction for circulation of the cooling medium in the first cooling system show the direction of flow of the first cooling medium while performing air conditioning operation (i.e. during the refrigeration cycle). After the cooling medium that has been compressed by the compressor 7 has passed through the radiator 3 that functions as a condenser, and after it has exchanged heat with the second cooling medium of the second cooling system (i.e. has cooled the second cooling medium) in the heat exchangers 8a and 8b that function as evaporators, it then returns to the compressor 7.

Figure 22:
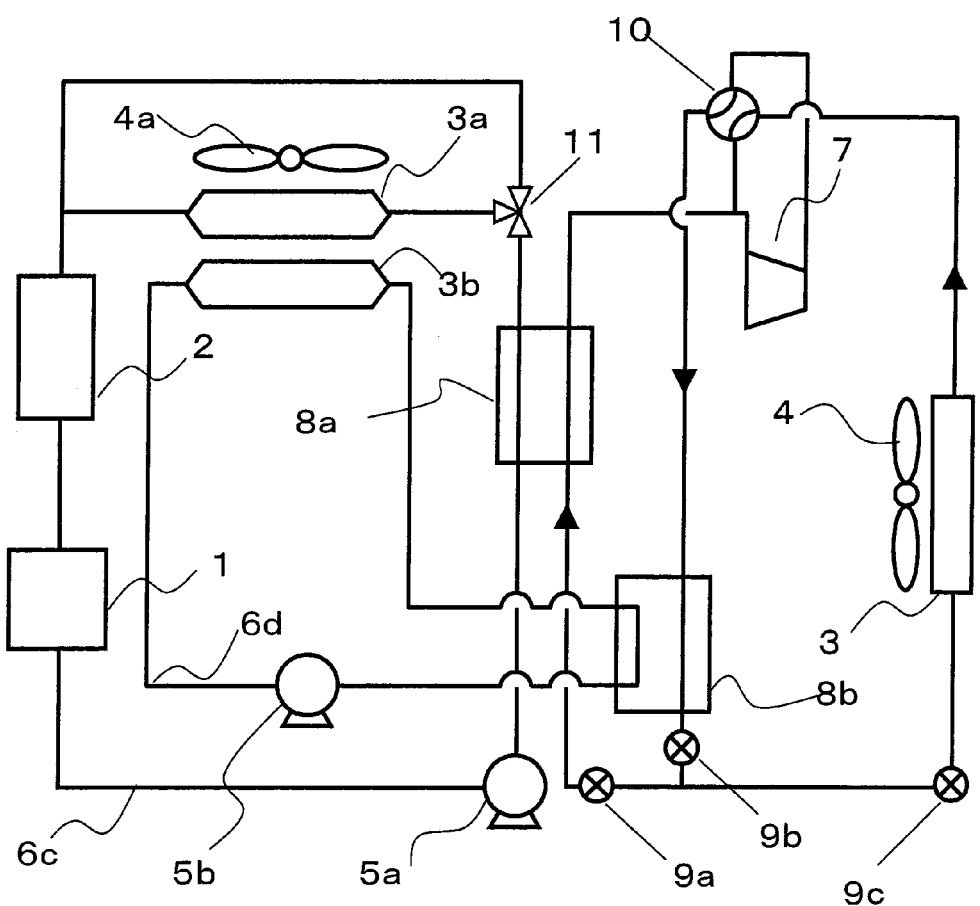
FIG. 22 is a figure showing the flow of a first cooling medium in this eighth embodiment during passenger compartment heating operation.

On the other hand, FIG. 22 shows the flow of the first cooling medium in this eighth embodiment during passenger compartment heating operation. After the cooling medium that has been compressed by the compressor 7 has employed the heat exchanger 8b as a condenser and has dissipated heat to the second cooling medium flowing through the circulation path 6d of the second cooling system for air conditioning the interior of the passenger compartment, and after it has passed through the heat exchanger 8a and through the radiator 3 that functions as a condenser, it returns to the compressor 7. In the heat exchanger 8a, it exchanges heat with (i.e. dissipates heat from) the second cooling medium flowing along the circulation path 6c for cooling the subjects for cooling of the second cooling system. In other words, since the heat evolved by cooling the motor 1 and the inverter power supply 2 is dissipated by the heat exchanger 8a to the first cooling medium of the first cooling system, accordingly the heat from the motor 1 and the inverter power supply 2 comes to be utilized for heating the interior of the passenger compartment. Due to this, it is possible to reduce the power required for passenger compartment heating.

According to this eighth embodiment, it is possible to implement cooling of the devices that are the subjects for cooling, and also both air conditioning of the interior of the vehicle passenger compartment and heating of the interior of the vehicle passenger compartment, all with a single system. Moreover, during passenger compartment heating operation, it becomes possible to perform heating of the passenger compartment with higher efficiency than in the prior art, since it is possible to employ the heat generated by the motor 1 and the inverter power supply 2 for this passenger compartment heating.

It should be understood that it would also be acceptable to arrange to install the radiator 14 and the fan 15 shown in FIG. 20 between the motor 1 and the pump 5a in the circulation path 6c for cooling the subjects for cooling of the eighth embodiment shown in FIGS. 21 and 22, in order to provide backup in the event of a malfunction of the first cooling system.

Embodiment 9

Figure 23:
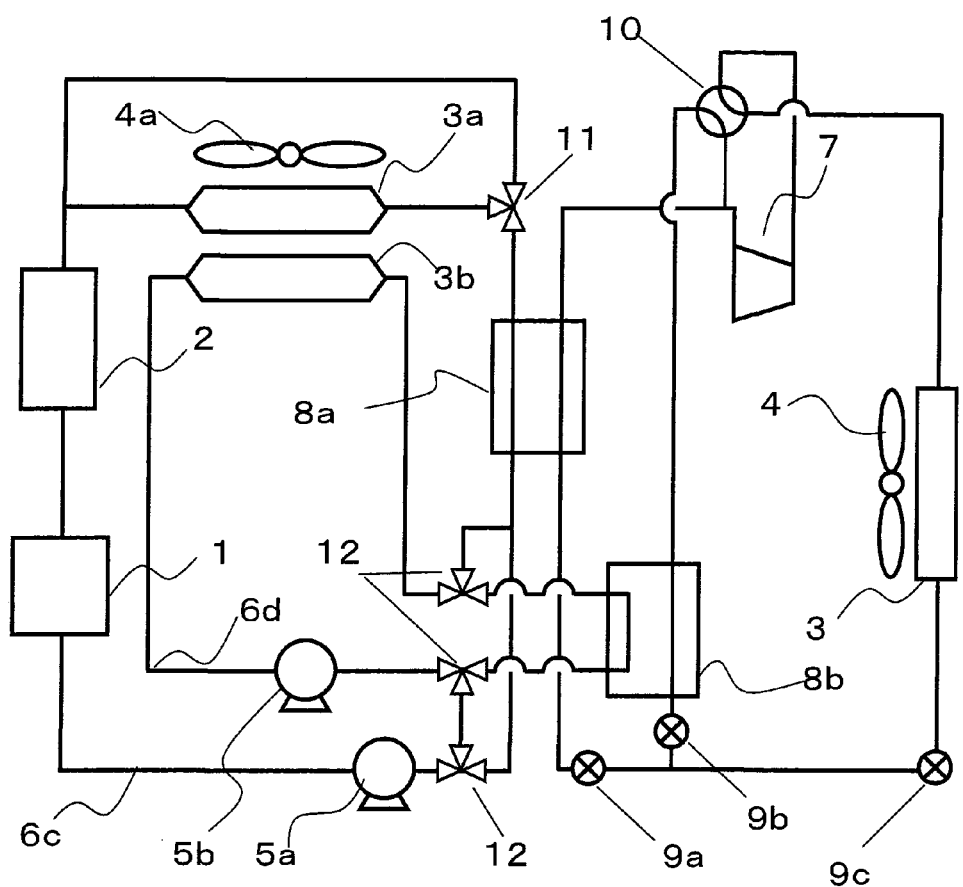
FIG. 23 is a figure showing the structure of a cooling system for an electric vehicle according to a ninth embodiment.
Figure 24:
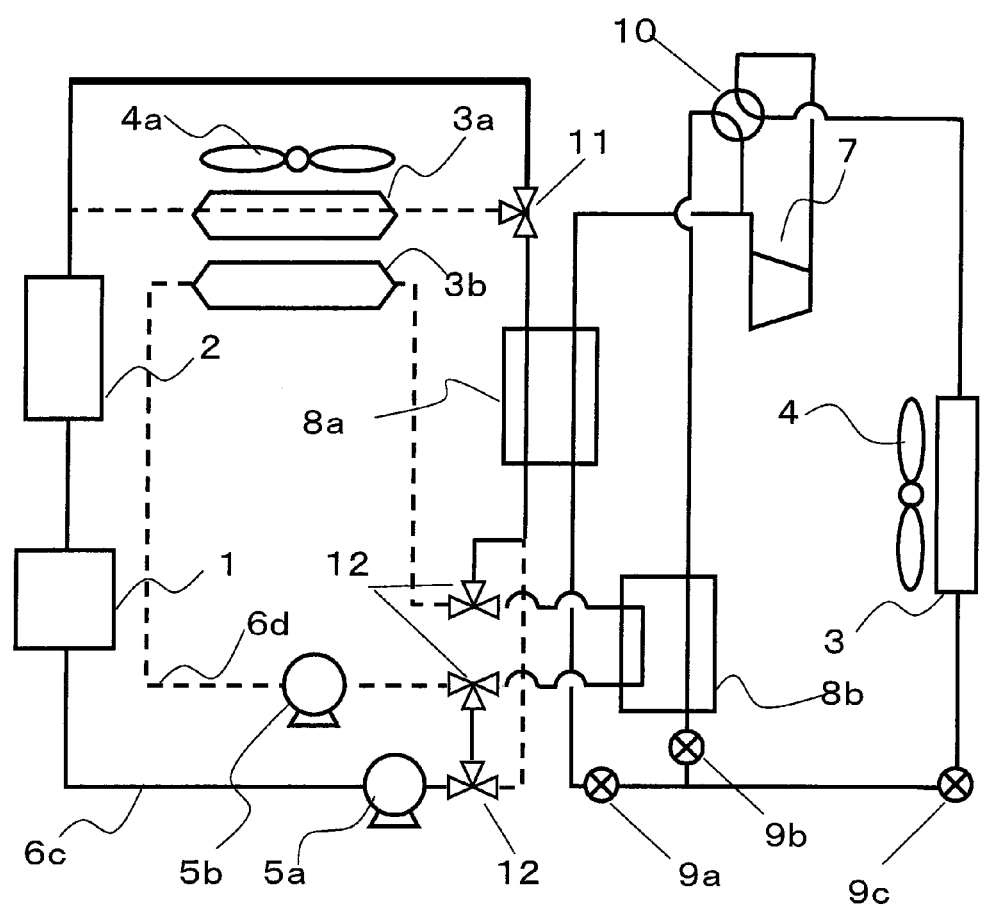
FIG. 24 is a figure showing the flow of a cooling medium in this cooling system for an electric vehicle according to the ninth embodiment, when a high cooling capability is being obtained.

The structure of a ninth embodiment of the cooling system for an electric vehicle according to the present invention is shown in FIG. 23. It should be understood that to elements that are the same as elements of the cooling systems of the various embodiments described above the same reference symbols are appended, and the explanation focuses upon the points of difference; and moreover, elements described above such as the fan drive device 21, the pump drive device 22, the control device 23, and devices connected to the control device 23 such as the vehicle speed sensor 24 and the accelerator sensor 25 and so on are omitted from FIG. 23, and explanation thereof is also omitted. In this ninth embodiment, three way valves 12 for flow conduit changeover are added to the eighth embodiment shown in FIGS. 21 and 22, so as to enhance the cooling capability for the motor 1 and the inverter power supply 2. In other words, when it is desired to provide a higher cooling capability, the three-way valves 12 for flow conduit changeover are set as shown in FIG. 24, so that the second cooling medium that is flowing through the circulation path 6c of the second cooling system for cooling the subjects for cooling flows through and is cooled by the two heat exchangers 8a and 8b in that order. In FIG. 24, the paths shown by the solid lines are paths through which the cooling medium is flowing, while the paths shown by the broken lines are paths through which the cooling medium is not flowing.

According to this ninth embodiment, it becomes possible to cool the subjects of cooling with higher cooling capability, although it becomes impossible to provide air conditioning for the interior of the passenger compartment. It would also be possible to install two flow rate control valves instead of the three-way valves 11 for bypass changeover when it is desired to enable air conditioning of the interior of the vehicle passenger compartment, so that the flow rate of the second cooling medium flowing in the heat exchanger 3a for passenger compartment air conditioning may be controlled.

It should be understood that it would also be acceptable to arrange to install the radiator 14 and the fan 15 shown in FIG. 20 between the motor 1 and the pump 5a in the circulation path 6c for cooling the subjects for cooling of the ninth embodiment shown in FIGS. 23 and 24, in order to provide backup in the event of a malfunction of the first cooling system.

Embodiment 10

Figure 25:
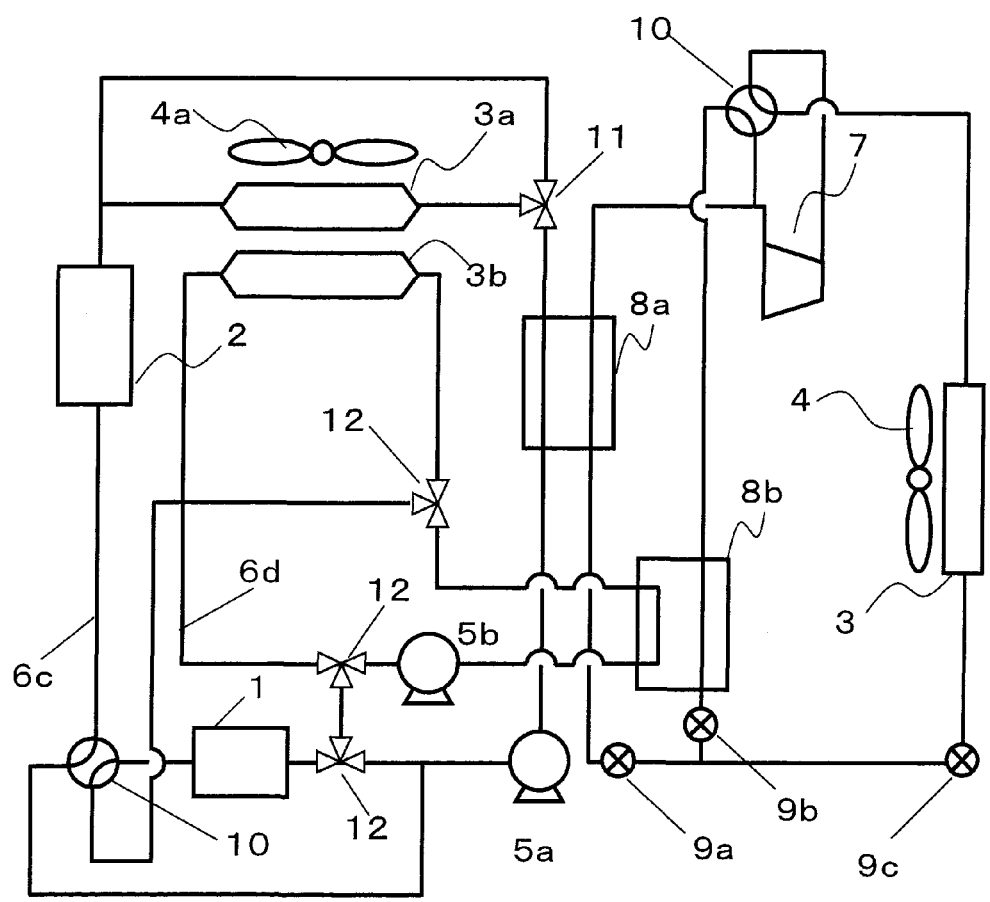
FIG. 25 is a figure showing the structure of a cooling system for an electric vehicle according to a tenth embodiment.

The structure of a tenth embodiment of the cooling system for an electric vehicle according to the present invention is shown in FIG. 25. It should be understood that to elements that are the same as elements of the cooling systems of the various embodiments described above the same reference symbols are appended, and the explanation focuses upon the points of difference; and moreover, elements described above such as the fan drive device 21, the pump drive device 22, the control device 23, and devices connected to the control device 23 such as the vehicle speed sensor 24 and the accelerator sensor 25 and so on are omitted from FIG. 25, and explanation thereof is also omitted. In this tenth embodiment, three way valves 12 for flow conduit changeover are added to the eighth embodiment shown in FIGS. 21 and 22, so that the cooling capability may be enhanced by cooling the motor 1 and the inverter power supply 2 in parallel.

Figure 26:
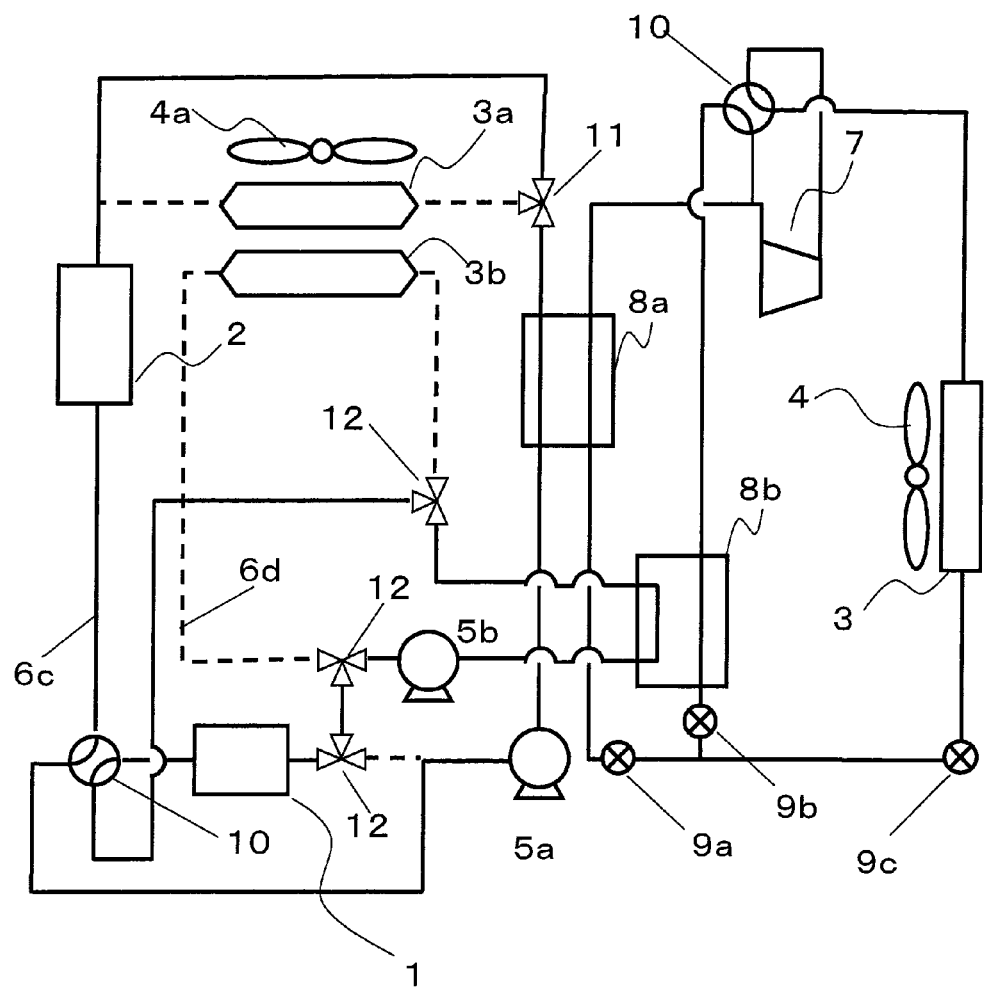
FIG. 26 is a figure showing the flow of a cooling medium in this cooling system for an electric vehicle according to the tenth embodiment, when a high cooling capability is being obtained.

In other words, when it is desired to provide a higher cooling capability, the three-way valves 12 for flow conduit changeover are set as shown in FIG. 26, so that, along with cooling the motor 1 using the second cooling medium that has been expelled by the pump 5b and has been cooled by the heat exchanger 8b, also the inverter power supply 2 is cooled using the second cooling medium that has been expelled by the pump 5a and has been cooled by the heat exchanger 8a. In FIG. 26, the paths shown by the solid lines are paths through which the cooling medium is flowing, while the paths shown by the broken lines are paths through which the cooling medium is not flowing. In this way it becomes possible to cool the subjects of cooling with higher cooling capability, although it becomes impossible to provide air conditioning for the interior of the passenger compartment.

Embodiment 11

An eleventh embodiment in which one of the above described embodiments of the cooling system for an electric vehicle according to the present invention is actually mounted to an electric vehicle will now be explained. While in this eleventh embodiment an example is shown in which the cooling system for an electric vehicle according to the sixth embodiment incorporating a first cooling system and a second cooling system as shown in FIG. 17 is mounted to the vehicle, it would also be possible to mount any of the cooling systems for an electric vehicle according to the first through the fifth or the seventh through the tenth embodiments to an electric vehicle, in a similar manner.

Figure 27:
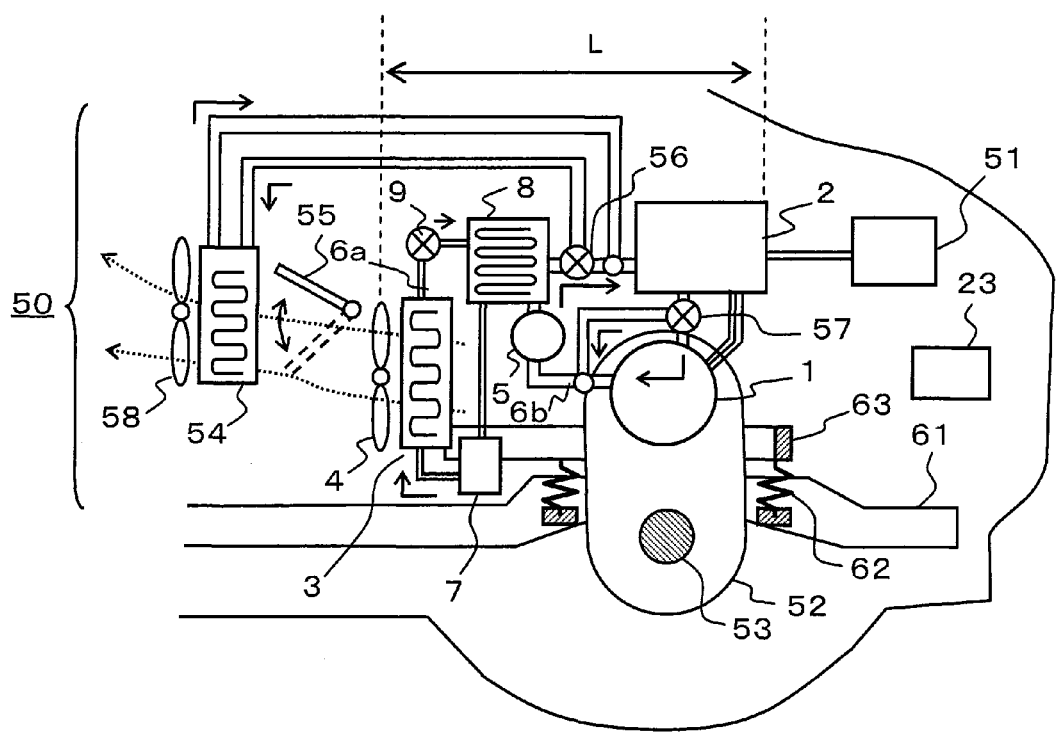
FIG. 27 is a figure showing an electric vehicle equipped with a cooling system according to the sixth embodiment, as seen from horizontally.
Figure 28:
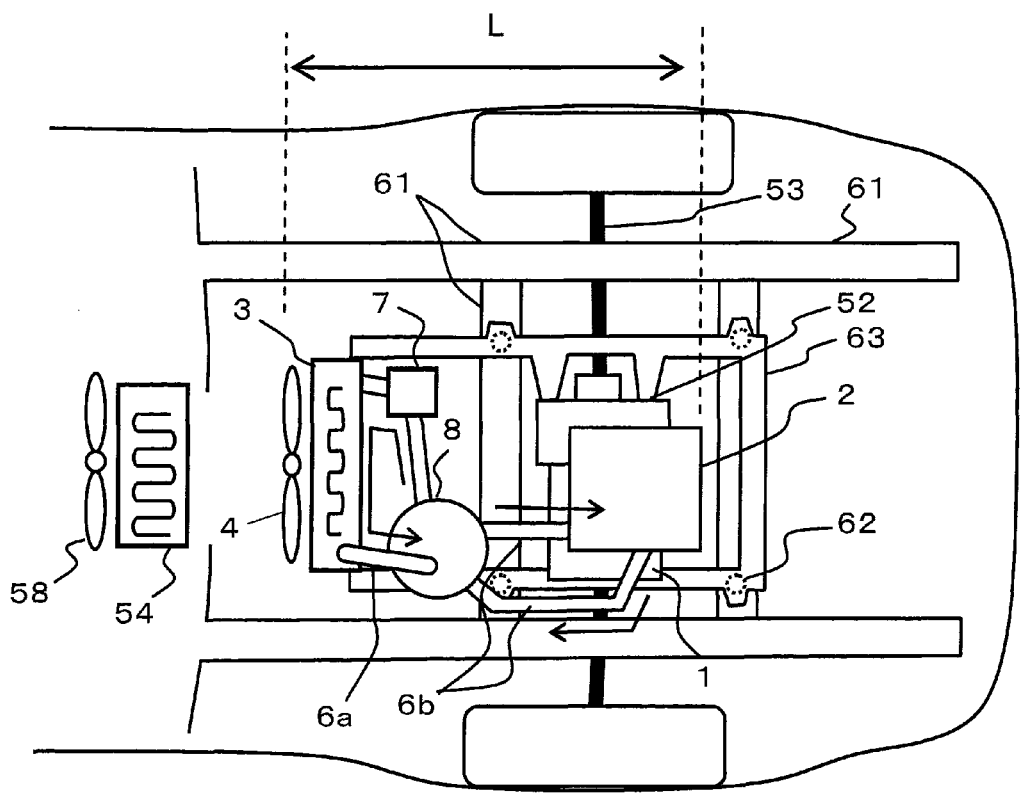
FIG. 28 is a figure showing this electric vehicle equipped with a cooling system according to the sixth embodiment, as seen from above.

FIG. 27 is a figure showing the front portion of an electric vehicle to which a cooling system is mounted as seen from horizontally, and FIG. 28 is a figure showing the front portion of this electric vehicle as seen from above. It should be understood that to elements that are the same as ones shown in FIG. 17 the same reference symbols are appended. In FIGS. 27 and 28, the vehicle is supposed to be moving rightwards across the drawing paper; and the electrical power system for this vehicle is mounted at the front of the vehicle. While this embodiment is explained in terms of an example of a front wheel drive type electric vehicle, it would also be possible to mount a cooling system for an electric vehicle according to any of the embodiments described above to an electric automobile or a hybrid automobile of the rear wheel drive type or of the four wheel drive type.

This electric drive system for an electric vehicle includes an electricity storage device 51 that stores driving electrical energy, an inverter power supply that controls electrical power supplying from the electricity storage device 51 to a motor 1, a motor 1 that receives electrical power from the inverter power supply 2 and generates rotational torque, a speed reduction device 52 that amplifies the torque of the motor 1, drive shafts 53 that transmit output power and torque from the speed reduction device 52 to vehicle wheels, a control device 23 that controls a target torque for the motor 1 and the operational state of a cooling system 50 according to the state of operation by the driver and the state of the cooling system 50, and the cooling system 50 that cools the inverter power supply 2 and the motor 1. In the following, in particular, the motor 1, the inverter power supply 2, and the speed reduction device 52 will be termed "drive components".

The cooling system 50 includes a first cooling system that is a refrigeration cycle and a second cooling system that performs water cooling (refer to FIG. 17). The first cooling system that is a refrigeration cycle includes a compressor 7, a radiator 3 (i.e. a heat exchanger with the external air), an adjustor 9 (i.e. an expansion valve), a heat exchanger 8, and a cooling medium circulation path 6a. A fan 4 is attached to the radiator 3, and blows air from the front of the vehicle through the radiator 3. The flow rate of this cooling air flow is adjusted by the rotational speed of the fan 4 being controlled by a control device 23. On the other hand, the second cooling system that performs water cooling includes a pump 5, the heat exchanger 8, a passenger compartment heat exchanger 54, an adjustable air deflector 55, three-way valves 56 and 57, and a cooling medium circulation path 6b (i.e. a conduit for cooling water). A fan 58 is provided to the passenger compartment heat exchanger 54, and blows the air interior to the vehicle passenger compartment through the passenger compartment heat exchanger 54, thus performing air conditioning of the passenger compartment. The volume of this air flow is adjusted by controlling the rotational speed of the fan 58 with the control device 23.

In this electric vehicle cooling system 50, the temperatures of the drive components and of the cooling mediums are detected and measured by temperature sensors or the like, although these sensors are not shown in FIGS. 27 and 28. The control device 23 controls the compressor 7, the fans 4 and 58, the pump 5, and the three-way valves 56 and 57 on the basis of the temperatures of the various drive components that make up this electrical drive system and the temperatures of the cooling mediums and on the basis of the operational states of the various components, and thereby controls the temperatures of the cooling mediums in the first cooling system and the second cooling system.

With this electric vehicle cooling system 50, a cooling medium such as an alternative for chlorofluorocarbon or the like that is suitable for a refrigeration cycle flows in the cooling medium circulation path 6a of the first cooling system that communicates the compressor 7, the adjustor 9 (i.e. the expansion valve), the radiator 3, and the heat exchanger 8, and this refrigerant cooling medium is cooled in the refrigeration cycle powered by the compressor 7. On the other hand, cooling water or antifreeze liquid or the like flows in the cooling medium circulation path 6b of the second cooling system that communicates the heat exchanger 8, the three-way valves 56 and 57, the inverter power supply 2, the motor 1, and the pump 5, and cools the drive components such as the inverter power supply 2, the motor 1, and so on, and also the interior of the passenger compartment. It should be understood that it would also be acceptable to perform cooling of the electrical storage device 51 with the cooling medium of the second cooling system at the same time. The cooling medium (i.e. cooling water or the like) of the second cooling system passes through the heat exchanger 8 in the cooling medium circulation path 6b, and is cooled in the cooling medium circulation path 6a of the first cooling system by heat exchange (i.e. heat dissipation) therewith in this heat exchanger 8. Moreover, air for performing air conditioning (or, heating according to circumstances) of the interior of the vehicle passenger compartment is blown by the fan 58 through the passenger compartment heat exchanger 54 in the direction shown by the dotted arrows in FIG. 27, and thereby the temperature in the interior of the vehicle passenger compartment may be adjusted.

With this cooling system 50, the temperatures of the cooling mediums in the first cooling system and the second cooling system may be changed as desired by controlling the operation of the compressor 7, the fans 4 and 58, the pump 5, and the three-way valves 56 and 57 with the control device 23. For example, if the load upon the inverter power supply 2 and the motor 1 is high so that the temperatures of the drive component become elevated, or if it is forecast in advance that the temperature of the drive components upon the road ahead will become elevated, then it is possible to increase the output drive power of the cooling system 50, so that the temperature of the cooling medium may be reduced. Generally, the thermal capacity of the inverter power supply 2 is lower than that of the motor 1, so that its temperature increases faster in response to increase of the drive load, and therefore, as compared to the motor 1, a higher cooling responsiveness and a lower cooling medium temperature are needed. Accordingly, it is desirable to construct the second cooling system so that the cooling medium that flows out of the heat exchanger 8 initially flows into the inverter power supply 2, and only thereafter flows into the motor 1.

In order to ensure that vibration and displacement generated due to the drive torque of the motor 1 are not transmitted to the frame 61 of the vehicle (i.e. to its skeleton), the motor 1 is mounted to the vehicle frame 61 via elastic support members (i.e. rubber mounts) 62 and a rigid sub-frame 63. The motor 1 is rigidly fixed to the sub-frame 63. And, as well as the motor 1, the various cooling devices such as the inverter power supply 2, the compressor 7, the adjustor (expansion valve) 9, the radiator (the heat exchanger outside the passenger compartment) 3, the fan 4, the passenger compartment heat exchanger 54, the pump 5, the three-way valves 56 and 57, the heat exchanger 8 and so on are rigidly installed upon the sub-frame 63. The components of this cooling system 50 (i.e. the adjustor 9, the compressor 7, the pump 5, the three-way valves 56 and 57, the heat exchanger 8, the radiator 3, the fan 4, and so on), and the inverter power supply 2 and the motor 1 are mutually connected together by the cooling medium circulation path 6a of the first cooling system and the cooling medium circulation path 6b of the second cooling system. Here, by integrating the various components, the cooling medium circulation path 6a of the first cooling system and the cooling medium circulation path 6b of the second cooling system may be curtailed. For example, if the inverter power supply 2 and the motor 1 are built together in a single housing, then it is possible to substitute a flow conduit within this housing for a portion of the cooling medium circulation path 6b of the second cooling system, so that it is possible further to shorten the total flow conduit length.

If the radiator 3 of the cooling system 50 is installed in the vicinity of the bumper at the front end of the vehicle as is typical for the radiator of a vehicle, then it is necessary to use conduits made of from some elastic material such as rubber hose or the like for connecting together the radiator 3 and the drive components (the inverter power supply 2 and the motor 1). This is in order to absorb relative displacement between the motor 1 and the vehicle frame 61 caused by the drive torque in elastic deformation of these conduits. When connecting together the radiator 3 and the drive components in this manner via conduits made from elastic material, it is necessary to connect them with comparatively long elastic conduits in order to absorb their mutual relative displacement. Due to this, it takes a comparatively long time for the cooling medium that has been cooled by the radiator 3 to arrive at the heat exchanger 8 and to cool the cooling medium in the second cooling system, and for the cooling medium in the second cooling system whose temperature has been reduced to arrive at the inverter power supply 2 and the motor 1.

Since, with this cooling system 50 according to this embodiment, it is arranged to install the inverter power supply 2, the motor 1, and the cooling system 50 upon the sub-frame 63 that is elastically supported upon the vehicle frame 61, accordingly it is possible to comparatively shorten the length of the conduits between the cooling medium circulation path 6a of the first cooling system and the cooling medium circulation path 6b of the second cooling system (or to omit these conduits completely), without giving any consideration to the displacement of motor 1 relative to the vehicle frame 61 due to the drive torque of the motor 1. Thus, it is possible to ensure that the cooling medium that has been cooled by the radiator 3 arrives at the inverter power supply 2 and the motor 1 within a comparatively short time period, and additionally it is possible to change the temperature of the cooling medium rapidly since it is possible to reduce its volume and its thermal capacity, so that it is possible to supply an electric vehicle cooling system 50 whose cooling responsiveness is excellent.

Furthermore, in this embodiment, the heat exchanger 8 is disposed between the radiator 3 and the inverter power supply 2. In other words, to consider the longitudinal range L as shown in FIGS. 27 and 28 that extends over the greatest separation between the radiator 3 and the inverter power supply 2, at least a portion of the heat exchanger 8 is disposed in the region of this section L. Due to this, it is possible to shorten the lengths of the conduits as compared with a configuration in which the heat exchanger 8 is located outside this section L, so that it is possible to convey the cooling medium that has been cooled by the radiator 3 and the heat exchanger 8 to the inverter power supply 2 and the motor 1 within a comparatively short time period.

With the positional relationship of the heat exchanger 8, the radiator 3, and the inverter power supply 2 shown in FIG. 28, it is possible to reduce the excessive conduit length, because the heat exchanger 8 is arranged in a position between the radiator 3 and the inverter power supply 2, and accordingly it is possible to supply a cooling system 50 whose cooling responsiveness is outstanding.

Furthermore, the cooling medium outlet of the radiator 3 is disposed nearer to the heat exchanger 8 than the cooling medium inlet. Due to this, it is possible for the cooling medium that has been cooled by the radiator 3 to arrive at the cooling medium inlet of the heat exchanger 8 in a comparatively short time period, as compared to the case in which the cooling medium outlet of the radiator 3 is disposed further from the heat exchanger 8 than its cooling medium inlet, and accordingly it is possible to provide a cooling system 50 whose cooling responsiveness is superlative. In a similar manner, the cooling medium outlet of the heat exchanger 8 is disposed closer to the inverter power supply 2 than its cooling medium inlet. Due to this, it is possible for the cooling medium that has been cooled by the heat exchanger 8 to arrive at the cooling medium inlet of the inverter power supply 2 in a comparatively short time period, as compared to the case in which the cooling medium inlet of the inverter power supply 2 is disposed further from the heat exchanger 8 than its cooling medium outlet, and accordingly it is possible to provide a cooling system 50 whose cooling responsiveness is outstanding.

In the forward direction of the electric vehicle (the rightward direction in FIG. 27), the radiator 3 is arranged more toward the rear of the vehicle than the drive components (the inverter power supply 2 and the motor 1). Due to this, by controlling the adjustable air deflector 55 to its position shown by the solid line in FIG. 27, it is possible to conduct the waste heat emitted by the radiator 3 during cooling of the drive components to the interior of the vehicle passenger compartment along the directions shown by the dotted arrows in FIG. 27. In particular, if the temperature of the cooling medium is controlled to be comparatively low in order to enhance its performance for cooling the drive components, then it is possible to employ this procedure as an alternative to, or as a supplement for, the room heating function for the vehicle passenger compartment provided by the passenger compartment heat exchanger 54.

Next, the cooling operation performed by this embodiment will be explained. During air conditioning operation, the cooling medium in the cooling medium circulation path 6a of the first cooling system is driven by the compressor 7 in the directions shown by the arrow signs in FIG. 27. This cooling medium is compressed into gas at high temperature and high pressure by the compressor 7, and then is condensed in the radiator 3 (i.e. the heat exchanger external to the passenger compartment) while emitting heat into the atmosphere, thus changing phase and becoming a liquid at high pressure. And then this cooling medium passes through the adjustor (i.e. the expansion valve) 9 so that its pressure drops, and thereby it is brought to low pressure and low temperature (i.e. 2-phase cooling medium of liquid and gas). Thereafter, this cooling medium passes through the heat exchanger 8 and exchanges heat with the cooling medium (for example, cooling water) that is flowing in the cooling medium circulation path 6*b* of the second cooling system. Meanwhile, the control device 23 adjusts the temperature and the flow rate of the cooling medium by driving and controlling the compressor 7.

The cooling medium in the second cooling system that has been cooled by the heat exchanger 8 is pressurized and sent along the cooling medium circulation path 6*b* by the pump 5, and a portion of this cooling medium passes through the passenger compartment heat exchanger 54 and cools the air in the passenger compartment. This cooling medium that has cooled the passenger compartment is then conducted to the inverter power supply 2 and the motor 1. But if the flow conduit to the passenger compartment heat exchanger 54 is intercepted by the three-way valve 56, then the cooling medium that flows out from the heat exchanger 8 is sent directly to the inverter power supply 2 and the motor 1. The cooling medium in this second cooling system then absorbs heat from the inverter power supply 2 and the motor 1 so that its temperature increases, and then is returned to the heat exchanger 8 via the pump 5. Along with drive controlling the pump 5 and the fan 4, the control device 23 also adjusts the temperature and the flow rate of the cooling medium in the second cooling system by changing over the flow connections of the three-way valves 56 and 57.

For example, if there is a possibility that the temperature of the inverter power supply 2 or the temperature of the motor 1 should rise in a short time, or if one of these temperatures exceeds its permitted range, then the flow of cooling medium to the passenger compartment heat exchanger 54 is intercepted by the three-way valve 56, so that the cooling medium flows directly into the inverter power supply 2 and the motor 1. In other words, the cooling medium flow conduit from the heat exchanger 8 to the inverter power supply 2 and the motor 1 is made shorter, while also preventing elevation of the temperature of the cooling medium due to exchange of heat by the passenger compartment heat exchanger 54. Due to this, it is possible to lower the temperature of the cooling medium flowing into the inverter power supply 2 and the motor 1 in a short time period, and accordingly it is possible to provide a cooling system 50 whose cooling responsiveness is superlative.

Moreover, if the temperature of the inverter power supply 2 is within its permitted range, then the cooling medium that flows out from the inverter power supply 2 is allowed to flow into the motor 1 via the three-way valve 57, thus cooling the motor 1. However, if the temperature of the inverter power supply 2 is currently exceeding its permitted range, or if there is a possibility that it may rise within a short time, then this flow into the motor 1 is intercepted by changing over the flow connections provided by the three-way valve 57, and instead is fed back to the pump 5. And if the load upon the inverter power supply 2 is reduced, then the three-way valve 57 is controlled so that the cooling medium also flows to the motor 1. In this manner the temperature elevation of the inverter power supply 2 (whose elevation of temperature is comparatively abrupt) can be rapidly suppressed, although the cooling of the motor 1 (whose elevation of temperature is comparatively gentle) is temporarily inactivated, and accordingly it is possible to provide a cooling system whose cooling responsiveness is excellent.

Furthermore, if it is necessary to raise the temperature in the passenger compartment at the same time that the temperature of the cooling medium drops, then the three-way valve 56 is controlled so as to prevent circulation of the cooling medium to the passenger compartment heat exchanger 54. At the same time, the adjustable air deflector 55 is controlled to shift to its position shown in FIG. 27 by the solid line, so that the heated air emitted from the radiator 3 is conducted to the interior of the vehicle passenger compartment. In this manner, by the radiator 3 being arranged more toward the rear of the vehicle than the drive components (the inverter power supply 2 and the motor 1), the distance between the radiator 3 and the passenger compartment becomes comparatively small, so that, even if the temperature of the cooling medium is quite low, still it is possible to heat the interior of the passenger compartment with the waste heat from the radiator 3.

It should be understood that the embodiments and variant embodiments described above may be employed individually or in various combinations.

According to the embodiments and variant embodiments described above, the following beneficial operational effects may be obtained. First, since it is arranged to provide the cooling medium circulation path 6 that circulates the cooling medium to the electric motor 1 and the inverter power supply 2 that drive the vehicle by electrical operation, the radiator 3 that performs heat exchange between the cooling medium and the external atmosphere, the pump 5 that circulates the cooling medium between the radiator 3 and the motor 1 and the inverter power supply 2 along the cooling medium circulation path 6, the fan 4 that blows air through the radiator 3, and the control device 23 that controls the cooling of the motor 1 and the inverter power supply 2 by controlling the pump 5 and the fan 4, and since it is arranged for the control device 23 to control the pump 5 and the fan 4 in the first cooling mode when the drive force for the vehicle provided by the motor 1 and the inverter power supply 2 is in the first operational region, and to control the pump 5 and the fan 4 in the second cooling mode, in which the cooling capability is higher than in the first cooling mode, when the drive force for the vehicle provided by the motor 1 and the inverter power supply 2 is in the second operational region that is higher than the first operational region, accordingly it is not necessary to build the physical sizes (i.e. the dimensions) of the motor 1 and the inverter power supply 2 as excessively large in size, and it is possible to reduce the physical sizes of the motor 1 and the inverter power supply 2, while still obtaining the same drive force as in the prior art. In addition to the above, since the cooling capability is increased only when a high drive force is required, accordingly it is possible to reduce the consumption of electrical power by the pump 5 and the fan 4, and therefore it is possible to enhance the operating efficiency of this electric vehicle as a whole.

Since, according to the embodiments and variant embodiments described above, the cooling capability in the first cooling mode is made to be a cooling capability that maintains the temperatures of the motor 1 and the inverter power supply 2 less than or equal to their upper limit temperatures when drive force for the vehicle in the first operational region is generated continuously by the motor 1 and the inverter power supply 2, while the cooling capability in the second cooling mode is made to be a cooling capability that maintains the temperatures of the motor 1 and the inverter power supply 2 less than or equal to their upper limit temperatures when drive force for the vehicle in the second operational region is generated for a short time period by the motor 1 and the inverter power supply 2, accordingly it is possible to determine the physical sizes of the motor 1 and the inverter power supply 2 by taking the rated continuous torque and the rated continuous output power in the first operational region as a reference; so that, as compared to the prior art in which the physical sizes of the motor 1 and the inverter power supply 2 were determined by taking the maximum torque and the maximum output power of the motor 1 in the second operational region as a reference, it is possible to obtain the short-term maximum torque and the short-term maximum output power from the motor 1 in the second operational region, while still anticipating that it will be possible to make the motor 1 and the inverter power supply 2 more compact. Accordingly, using a motor 1 and an inverter power supply 2 whose physical sizes are smaller than in the prior art, it is possible to generate relatively low torque and relatively low output power from the motor 1 continuously during steady operation of the vehicle, and also, when the vehicle is starting off from rest, during acceleration, while ascending a slope or the like, it is possible to generate relatively high torque and relatively high output power from the motor 1 over a short time period.

Since, according to the embodiments and variant embodiments described above, the vehicle speed sensor 24 that detects the speed of the vehicle and the accelerator sensor 25 that detects the accelerator pedal depression amount are provided, and since it is arranged to obtain the drive force for the vehicle on the basis of the speed detected by the vehicle speed sensor 24 and the accelerator pedal depression amount detected by the accelerator sensor 25, and to select the first cooling mode or the second cooling mode according to whether the torque and rotational speed operating point of the motor 1 and the inverter power supply 2 corresponding to the drive force for the vehicle lies in the first operational region or the second operational region, accordingly it is possible to select a cooling mode accurately during vehicle operation according to the torque and the output power of the motor 1, and thus it is possible to cool the motor 1 and the inverter power supply 2 in an appropriate manner.

Since, according to the embodiments and variant embodiments described above, the navigation device 28 that acquires a path to the destination, the current position of the vehicle, and road information is provided, and since it is arranged to forecast the operating point of the motor 1 and the inverter power supply 2 upon the roads included in the path to the destination on the basis of the road information for the path, and to change over from the first cooling mode to the second cooling mode even if the operating point of the motor 1 and the inverter power supply 2 at the current position is in the first operational region if, on the basis of results of the above forecast, there is a road within a predetermined distance forward of the current position for which the second operational region will be applied, accordingly it is possible to suppress elevation of the temperatures of the motor 1 and the inverter power supply 2 in the road section for which the second operational region will be applied to temperatures lower than their upper limit temperatures. To put this in another manner, a clearance is left before arriving at the upper limit temperatures, so that it is possible to set the rated short-term torque and output power in the second operational region at yet larger values.

Since, according to the embodiments and variant embodiments described above, the manual changeover switch 29 is provided for a human being manually to change over between the first cooling mode and the second cooling mode, and since it is arranged to change over from the first cooling mode to the second cooling mode even if the operating point of the motor 1 and the inverter power supply 2 is in the first operational region if the second cooling mode has been selected by the manual changeover switch 29, accordingly, if the driver of the vehicle wishes to increase the cooling capability due to his driving preferences or due to the weather conditions or the travel conditions during driving or the like, then it is possible to accord priority to the intention of the driver and to perform cooling in the second cooling mode in which the cooling capacity is higher, and it is possible to effectively supplement the function of automatically selecting a cooling mode, with a function of manual selection.

Since, according to the embodiments and variant embodiments described above, the external air temperatures sensor 31 that detects the external air temperature is provided, and since it is arranged to make the first operational region narrower and to make the second operational region wider, the higher is the external air temperature detected by the temperature detection unit, accordingly, the higher the external air temperature becomes, the easier does it become to change over to the second operational region, so that it is possible to compensate for the reduction of cooling capability that accompanies rise of the external air temperature.

Since, according to the embodiments and variant embodiments described above, it is arranged to obtain a target temperature for the motor 1 at which the sum of the loss generated by the motor 1 and the inverter power supply 2 for obtaining drive force for the vehicle, and the electrical power consumed by the pump 5 and the fan 4 for cooling the amount of heat generated accompanying the loss, becomes a minimum, and to control the pump 5 and the fan 4 so that the temperature of the motor 1 attains the target temperature, accordingly it is possible to operate the motor 1, the inverter power supply 2, the fan 4, and the pump 5 at that motor temperature at which the integrated efficiency of the system becomes the highest, in consideration not only of the efficiency of the motor 1 itself, but also of the electrical power consumed by the pump 5 and the fan 4 themselves for providing cooling; and thus it is possible to implement energy saving operation.

Since, according to the embodiments and variant embodiments described above, the driver identification device 30 that identifies the driver of the vehicle and the memory 23*m* that stores driving history for each driver are provided, and since it is arranged to determine the driving tendency of the current driver by reading out the driving history of the current driver from the storage unit, and to change the boundary between the first operational region and the second operational region according to the result of this driving tendency determination, accordingly, for a driver who has exhibited a tendency to desire a larger acceleration, even if the motor operating point is same with that of an average driver, the range of the second cooling mode in which the cooling capability is higher is extended even at the same motor operating point; and thus it becomes possible to perform cooling of the motor 1 and the inverter power supply 2 at a cooling capability that is matched to the individual driving characteristics of the driver.

Since, according to the embodiments and variant embodiments described above, instead of the radiator 3, there is provided another cooling medium circulation path 6*a* that is different from the first cooling medium circulation path 6*b*, and, upon this other cooling medium circulation path 6*a*, there are provided the compressor 7 that compresses another cooling medium, the radiator 3 that condenses the other cooling medium after compression and dissipates heat therefrom to external air, the control valve 9 that lowers the pressure of the other cooling medium after condensation, and the heat exchanger 8 that vaporizes the other cooling medium and absorbs heat from the cooling medium upon the cooling medium circulation path 6b, accordingly it is possible to lower the temperature of the cooling medium flowing in the cooling medium circulation path 6b to lower than air temperature, so that it is possible further to enhance the cooling capability.

Since, according to the embodiments and variant embodiments described above, the inverter power supply 2 is provided on the upstream side of the cooling medium circulation path 6 while the motor 1 is provided on the downstream side thereof, accordingly it is possible to build an optimum cooling system by according consideration to the thermal time constants of the motor 1 and the inverter power supply 2.

The above described embodiments are examples; various modifications can be made without departing from the scope of the invention.

What is claimed is:

1. A cooling system of an electric vehicle, comprising:
    a cooling medium circulation path in which a cooling medium is circulated to an electrically powered drive unit that drives a vehicle by electrical power;
    a heat exchange unit that performs exchange of heat between the cooling medium and external air;
    a cooling medium circulation unit that circulates the cooling medium along the cooling medium circulation path between the heat exchange unit and the electrically powered drive unit;
    a blower unit that blows air against the heat exchange unit; and
    a control unit that controls the cooling medium circulation unit and the blower unit, thus controlling cooling of the electrically powered drive, wherein
        the control unit: when a drive force for the vehicle provided by the electrically powered drive unit is in a first operational region, controls the cooling medium circulation unit and the blower unit in a first cooling mode; and, when the drive force for the vehicle provided by the electrically powered drive unit is in a second operational region that is higher than the first operational region, controls the cooling medium circulation unit and the blower unit in a second cooling mode that provides a higher cooling capability than that provided in the first cooling mode, and
        the control unit obtains a target temperature for the electrically powered drive unit at which a sum of loss generated by the electrically powered drive unit for obtaining drive force for the vehicle, and electrical power consumed by the cooling medium circulation unit and the blower unit for cooling generated heat accompanying the loss, becomes a minimum, and controls the cooling medium circulation unit and the blower unit so that a temperature of the electrically powered drive unit attains the target temperature.

2. A cooling system of an electric vehicle according to claim 1, wherein: when the drive force for the vehicle is generated continuously in the first operational region by the electrically powered drive unit, a cooling capability in the first cooling mode is a cooling capability that maintains a temperature of the electrically powered drive unit less than or equal to an upper limit temperature; and, when drive force for the vehicle is generated for a short time period in the second operational region by the electrically powered drive unit, a cooling capability in the second cooling mode is a cooling capability that maintains a temperature of the electrically powered drive unit less than or equal to the upper limit temperature.

3. A cooling system of an electric vehicle according to claim 1, further comprising a temperature detection unit that detects an external air temperature; and wherein the control unit makes the first operational region narrower and makes the second operational region wider, the higher is the external air temperature detected by the temperature detection unit.

4. A cooling system of an electric vehicle according to claim 1, further comprising:
    an identification unit that identifies a driver of the vehicle; and
    a storage unit that stores driving history for each driver; and wherein
        the control unit determines a driving tendency of the driver by reading out the driving history of the driver from the storage unit, and changes boundary between the first operational region and the second operational region according to the driving tendency of this determination results.

5. A cooling system of an electric vehicle according to claim 1, wherein the heat exchange unit includes another cooling medium circulation path different from the cooling medium circulation path, and comprises, in this another cooling medium circulation path: a compressor that compresses another cooling medium; a condenser that condenses the another cooling medium after compression with dissipating heat therefrom to external air; an expansion valve that lowers a pressure of the another cooling medium after condensation; and an evaporator that vaporizes the another cooling medium and absorbs heat from the cooling medium upon the cooling medium circulation path.

6. A cooling system of an electric vehicle according to claim 1, wherein the electrically powered drive unit comprises an electric motor that drives the vehicle to travel and an electrical power converter that drives the electric motor, and the electrical power converter is provided on an upstream side of the cooling medium circulation path while the electric motor is provided on a downstream side thereof.

7. A cooling system of an electric vehicle according to claim 1, further comprising:
    a vehicle speed detection unit that detects the speed of the vehicle; and
    an accelerator pedal depression amount detection unit that detects an accelerator pedal depression amount, wherein
        the control unit obtains the drive force for the vehicle based on a speed detected by the vehicle speed detection unit and on the accelerator pedal depression amount detected by the accelerator pedal depression unit, and selects the first cooling mode or the second cooling mode according to whether an operating point of torque and rotational speed of the electrically powered drive unit corresponding to the drive force for the vehicle lies in the first operational region or the second operational region.

8. A cooling system of an electric vehicle according to claim 7, further comprising:
    a path search unit that searches for a path to a destination;
    a current position detection unit that detects a current position of the vehicle;
    an acquisition unit that acquires a road information; and
    a forecasting unit that forecasts operating point of the electrically powered drive unit upon a road of the path based on the road information for the path; and wherein
        the control unit changes over from the first cooling mode to the second cooling mode even if the operating point of the electrically powered drive unit at the current position is in the first operational region if, based on results of forecasting by the forecasting unit, there is a road within a predetermined distance forward of the current position for which the second operational region will be applied.

9. A cooling system of an electric vehicle according to claim 7, further comprising:
a changeover control member for a human being manually to change over between the first cooling mode and the second cooling mode; and wherein the control unit changes over from the first cooling mode to the second cooling mode even if the operating point of the electrically powered drive unit is in the first operational region if the second cooling mode has been selected by the changeover control member.

* * * * *